(12) United States Patent
Georgeson et al.

(10) Patent No.: US 12,005,467 B2
(45) Date of Patent: *Jun. 11, 2024

(54) END EFFECTORS AND METHODS FOR ADHESIVELY ATTACHING A FIRST PART TO A SECOND PART

(71) Applicant: The Boeing Company, Chicago, IL (US)

(72) Inventors: Gary E. Georgeson, Tacoma, WA (US); Marc J. Piehl, Renton, WA (US); Joseph L. Hafenrichter, Auburn, WA (US)

(73) Assignee: The Boeing Company, Arlington, VA (US)

( * ) Notice: Subject to any disclaimer, the term of this patent is extended or adjusted under 35 U.S.C. 154(b) by 325 days.

This patent is subject to a terminal disclaimer.

(21) Appl. No.: 17/494,541

(22) Filed: Oct. 5, 2021

(65) Prior Publication Data

US 2023/0107716 A1 Apr. 6, 2023

(51) Int. Cl.
*B05C 11/00* (2006.01)
*B05C 5/02* (2006.01)
*B25J 15/00* (2006.01)

(52) U.S. Cl.
CPC ............... *B05C 11/00* (2013.01); *B05C 5/02* (2013.01); *B25J 15/0066* (2013.01)

(58) Field of Classification Search
CPC ........ B05C 11/00; B05C 5/02; B25J 15/0066; B29C 70/38; B29C 70/382; B29C 70/384; B29C 70/386; B29C 70/388; B32B 41/00
See application file for complete search history.

(56) References Cited

U.S. PATENT DOCUMENTS

| | | | |
|---|---|---|---|
| 4,750,960 A | 6/1988 | Bubeck | |
| 4,795,451 A | 1/1989 | Buckley | |
| 8,651,046 B1 | 2/2014 | Davancens et al. | |
| 2003/0137080 A1* | 7/2003 | Bouras | B05C 11/101 264/272.17 |
| 2017/0197350 A1 | 7/2017 | Song | |
| 2019/0344293 A1* | 11/2019 | Knott | B05B 12/004 |
| 2023/0107591 A1* | 4/2023 | Georgeson | B05C 11/1018 156/64 |

* cited by examiner

*Primary Examiner* — George R Koch
(74) *Attorney, Agent, or Firm* — Kunzler Bean & Adamson

(57) ABSTRACT

An end effector, for adhesively attaching a first part to a second part, comprises a support, a first nozzle, movable relative to the support, and a second nozzle, movable relative to the support. The first nozzle comprises a first-nozzle-body outlet port and a first-nozzle separator plate. The second nozzle comprises a second-nozzle-body outlet port and a second-nozzle separator plate. The end effector additionally comprises a first ultrasonic-sensor roller that is rotatable relative to the support and located between the first nozzle and the second nozzle. The end effector also comprises a second ultrasonic-sensor roller that is rotatable relative to the support and located between the first ultrasonic-sensor roller and the second nozzle.

20 Claims, 14 Drawing Sheets

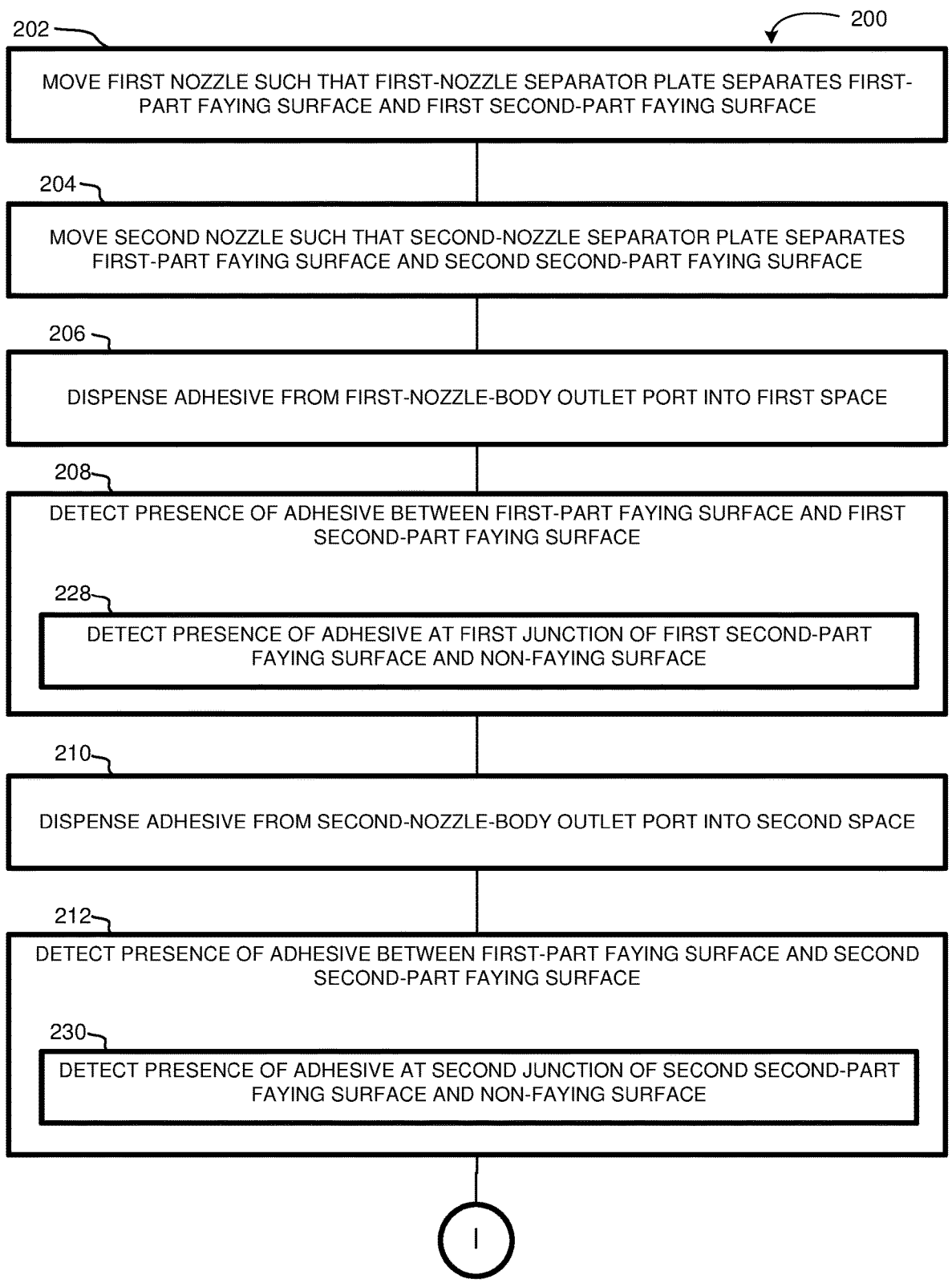

(CONTINUED TO FIG. 11C)

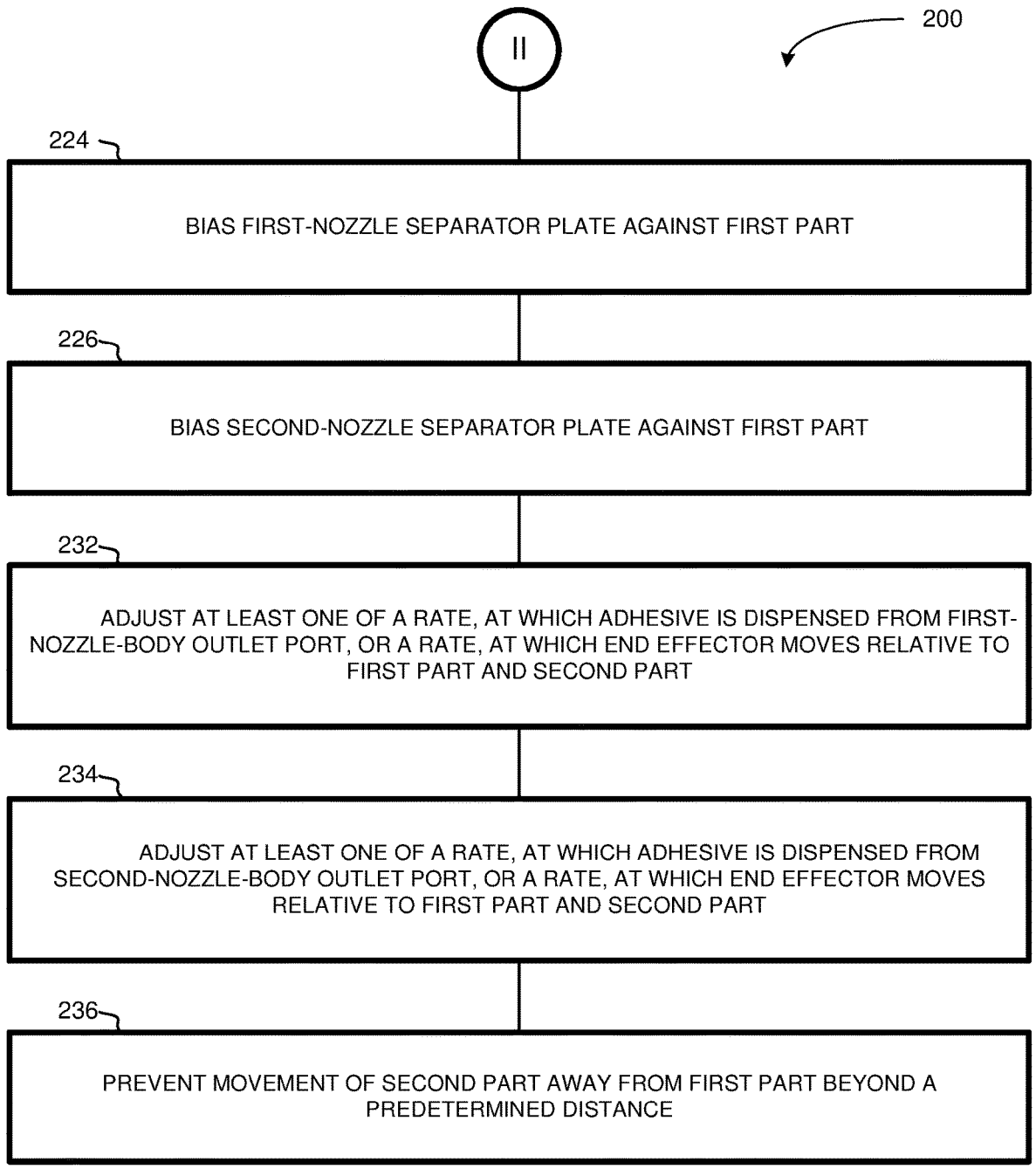
FIG. 11C
(CONTINUED FROM FIG. 11B)

END EFFECTORS AND METHODS FOR ADHESIVELY ATTACHING A FIRST PART TO A SECOND PART

TECHNICAL FIELD

Described herein are end effectors and methods for adhesively attaching a first part to a second part.

BACKGROUND

During assembly of structures, such as an aircraft or a component thereof, parts are often adhesively interconnected. It is desirable to fully automate deposition of the adhesive between the parts to reduce cost and manufacturing lead time. However, the need for creating and maintaining a properly sized gap between faying surfaces of the parts, for receiving the adhesive, complicates the task of automating the deposition of adhesive between the faying surfaces. Automated deposition of adhesive is further complicated by the fact that propagation of the adhesive between the parts must often be controlled to prevent the adhesive from being deposited in locations where its presence is undesirable or unnecessary.

SUMMARY

Accordingly, apparatuses and methods, intended to address at least the above-identified concerns, would find utility.

The following is a non-exhaustive list of examples of the subject matter, disclosed herein.

Disclosed herein is an end effector for adhesively attaching a first part to a second part. The end effector comprises a support and a first nozzle. The first nozzle is coupled to the support and is movable relative to the support. The first nozzle comprises a first-nozzle body, comprising a first-nozzle-body outlet port. The first nozzle also comprises a first-nozzle separator plate, extending from the first-nozzle body. The end effector further comprises a second nozzle, coupled to the support and movable relative to the support. The second nozzle comprises a second-nozzle body, comprising a second-nozzle-body outlet port. The second nozzle also comprises a second-nozzle separator plate, extending from the second-nozzle body. The end effector additionally comprises a first ultrasonic-sensor roller, coupled to the support, such that the first ultrasonic-sensor roller is translationally movable relative to the support. The first ultrasonic-sensor roller is rotatable relative to the support and is located between the first nozzle and the second nozzle. The end effector also comprises a second ultrasonic-sensor roller, coupled to the support, such that the second ultrasonic-sensor roller is translationally movable relative to the support. The second ultrasonic-sensor roller is rotatable relative to the support and is located between the first ultrasonic-sensor roller and the second nozzle.

The end effector provides for depositing the adhesive, through the first-nozzle-body outlet port and the second-nozzle-body outlet port, into corresponding spaces (e.g., the first space and the second space) between the first part and the second part. The first-nozzle separator plate promotes separation between the first part and the second part to create the first space. Similarly, the second-nozzle separator plate promotes separation between the first part and the second part to create the second space. The first-nozzle-body outlet port and the first-nozzle separator plate enable the adhesive to be deposited, through the first-nozzle-body outlet port, into the first space when the first-nozzle separator plate is located between and is separating the first part and the second part. Accordingly, a configuration of the first-nozzle-body outlet port and the first-nozzle separator plate maintains separation between the first part and the second part as the adhesive is deposited, through the first-nozzle-body outlet port, between the first part and the second part. Likewise, the second-nozzle-body outlet port and the second-nozzle separator plate enable the adhesive to be deposited, through the second-nozzle-body outlet port, into the second space when the second-nozzle separator plate is located between and is separating the first part and the second part. Accordingly, a configuration of the second-nozzle-body outlet port and the second-nozzle separator plate maintains separation between the first part and the second part as the adhesive is deposited, through the second-nozzle-body outlet port, between the first part and the second part. The first ultrasonic-sensor roller and the second ultrasonic-sensor roller, being rotatable relative to the support, enables the first ultrasonic-sensor roller and the second ultrasonic-sensor roller to roll along the second part as the end effector moves relative to the first part and the second part. Also, the first ultrasonic-sensor roller, being located between the first nozzle and the second nozzle, and the second ultrasonic-sensor roller, being located between the first ultrasonic-sensor roller and the second nozzle, provides for detection of adhesive between the first part and the second part, by the first ultrasonic-sensor roller and the second ultrasonic-sensor roller, at locations away from the first-nozzle-body outlet port and the second-nozzle-body outlet port, which helps to monitor the spread of the adhesive away from the first-nozzle-body outlet port and the second-nozzle-body outlet port.

Also disclosed herein is a method of using the end effector for adhesively attaching the first part, which comprises a first-part faying surface, to the second part, which comprises a first second-part faying surface and a second second-part faying surface. The second second-part faying surface is spaced away from the first second-part faying surface. The method comprises moving the first nozzle, relative to the support, such that the first-nozzle separator plate is inserted between and separates the first-part faying surface and the first second-part faying surface. The method also comprises moving the second nozzle, relative to the support, such that the second-nozzle separator plate is inserted between and separates the first-part faying surface and the second second-part faying surface. The method further comprises, with the first-nozzle separator plate inserted between and separating the first-part faying surface and the first second-part faying surface, dispensing an adhesive, in a first-nozzle dispensing direction, from the first-nozzle-body outlet port into a first space, defined between the first-part faying surface and the first second-part faying surface, and detecting presence of the adhesive between the first-part faying surface and the first second-part faying surface by using the first ultrasonic-sensor roller. The method additionally comprises, with the second-nozzle separator plate inserted between and separating the first-part faying surface and the second second-part faying surface, dispensing the adhesive, in a second-nozzle dispensing direction, from the second-nozzle-body outlet port into a second space, defined between the first-part faying surface and the second second-part faying surface, and detecting the presence of the adhesive between the first-part faying surface and the second second-part faying surface by using the second ultrasonic-sensor roller. The first-nozzle dispensing direction is toward and opposite the second-nozzle dispensing direction.

The method facilitates depositing the adhesive through the first-nozzle-body outlet port and the second-nozzle-body outlet port, into the first space and the second space between the first part and the second part. Inserting the first-nozzle separator plate between the first-part faying surface and the first second-part faying surface acts as a wedge to facilitate separation between the first part and the second part to create the first space. Similarly, inserting the second-nozzle separator plate between the first-part faying surface and the second second-part faying surface promotes separation between the first part and the second part to create the second space. The first-nozzle-body outlet port and the first-nozzle separator plate enable the adhesive to be deposited, through the first-nozzle-body outlet port, into the first space when the first-nozzle separator plate is located between and is separating the first part and the second part. Accordingly, a configuration of the first-nozzle-body outlet port and the first-nozzle separator plate maintains separation between the first part and the second part as the adhesive is deposited, through the first-nozzle-body outlet port, between the first part and the second part. Likewise, the second-nozzle-body outlet port and the second-nozzle separator plate enable the adhesive to be deposited, through the second-nozzle-body outlet port, into the second space when the second-nozzle separator plate is located between and is separating the first part and the second part. Accordingly, a configuration of the second-nozzle-body outlet port and the second-nozzle separator plate maintains separation between the first part and the second part as the adhesive is deposited, through the second-nozzle-body outlet port, between the first part and the second part. Detecting the presence of the adhesive between the first-part faying surface and the first second-part faying surface, using the first ultrasonic-sensor roller, and detecting the presence of the adhesive between the first-part faying surface and the second second-part faying surface, using the second ultrasonic-sensor roller, helps to control the spread of dispensed adhesive and to prevent dispensing the adhesive between the non-faying surface of the second part and the first-part faying surface where the adhesive is not needed.

BRIEF DESCRIPTION OF THE DRAWINGS

Reference will now be made to the accompanying drawings, which are not necessarily drawn to scale, and where like reference characters designate the same or similar parts throughout the several views. In the drawings:

FIGS. 11A, 11B, and 11C, collectively, are a block diagram of a method, according to one or more examples of the subject matter, disclosed herein, of adhesively attaching a first part to a second part utilizing the end effector of FIG. 1, according to one or more examples of the subject matter, disclosed herein.

DETAILED DESCRIPTION

Figure 1:
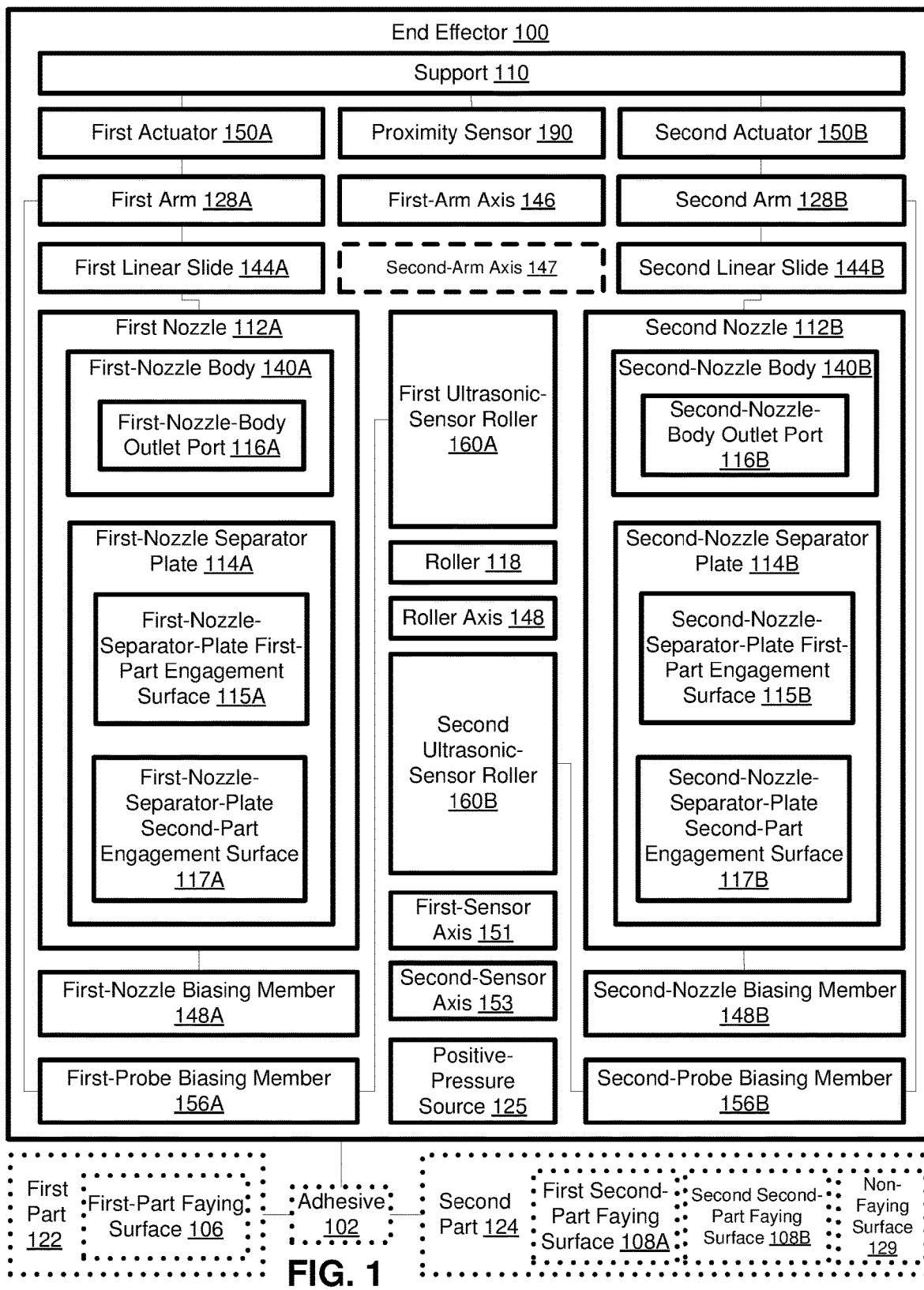
FIG. 1 is a block diagram of an end effector for adhesively attaching a first part to a second part, according to one or more examples of the subject matter, disclosed herein.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

Figure 11B:
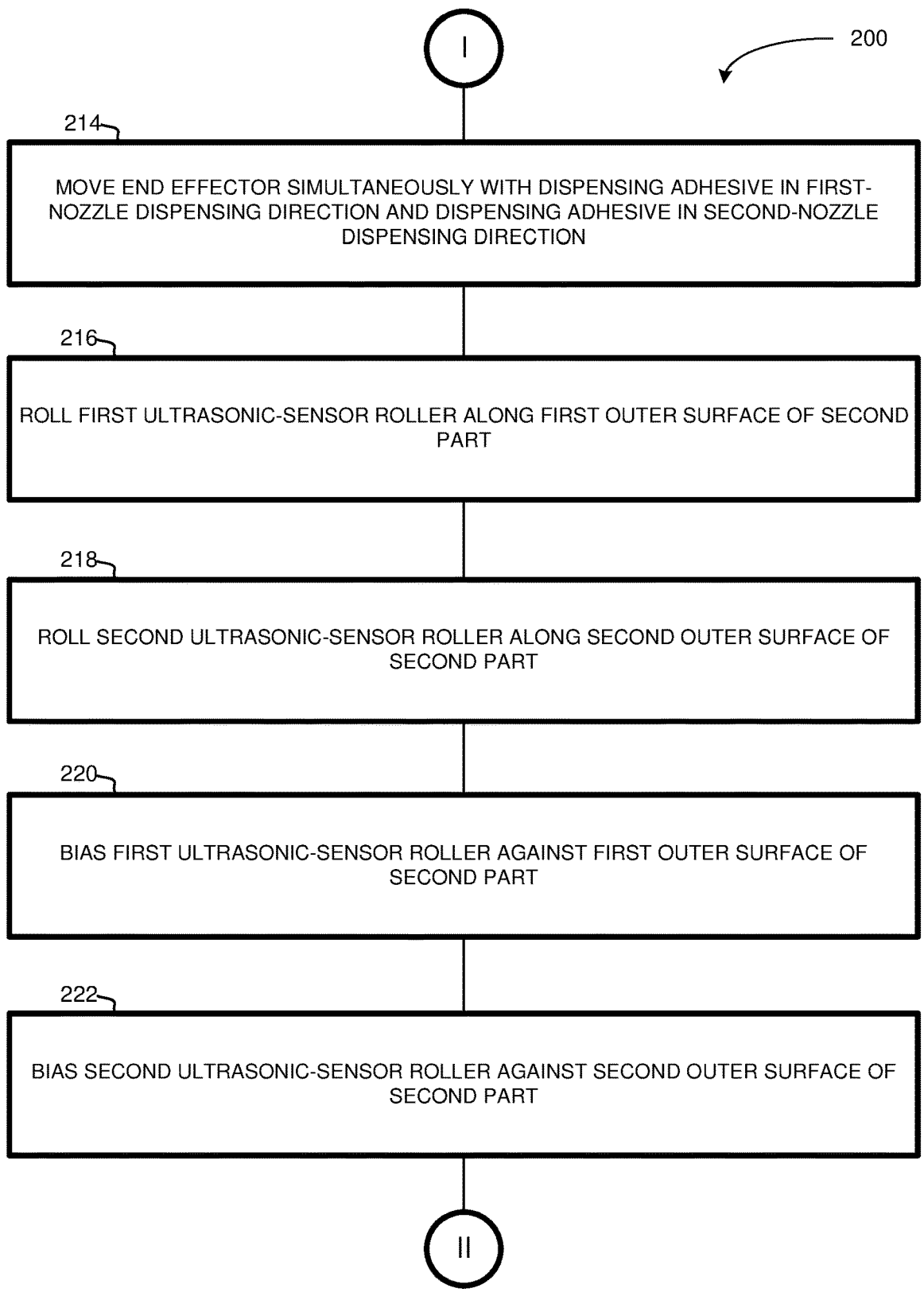

In FIGS. 11A, 11B, and 11C, referred to above, the blocks may represent operations and/or portions thereof and lines connecting the various blocks do not imply any particular order or dependency of the operations or portions thereof.

Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 11A, 11B, and 11C and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples of the subject matter, disclosed herein, are provided below.

Referring generally to FIG. 1 and particularly to, e.g., FIGS. 2A-10 for illustrative purposes only and not by way of limitation, the following portion of this paragraph delineates example 1 of the subject matter, disclosed herein. According to example 1, end effector 100, for adhesively attaching first part 122 to second part 124, comprises support 110. End effector 100 also comprises first nozzle 112A, coupled to support 110 and movable relative to support 110. First nozzle 112A comprises first-nozzle body 140A, comprising first-nozzle-body outlet port 116A. First nozzle 112A also comprises first-nozzle separator plate 114A, extending from first-nozzle body 140A. End effector 100 further comprises second nozzle 112B, coupled to support 110 and movable relative to support 110. Second nozzle 112B comprises second-nozzle body 140B, comprising second-nozzle-body outlet port 116B. Second nozzle 112B also comprises second-nozzle separator plate 114B, extending from second-nozzle body 140B. End effector 100 additionally comprises first ultrasonic-sensor roller 160A that is coupled to support 110, such that first ultrasonic-sensor roller 160A is translationally movable relative to support 110. First ultrasonic-sensor roller 160A is rotatable relative to support 110 and is located between first nozzle 112A and second nozzle 112B. End effector 100 also comprises second ultrasonic-sensor roller 160B that is coupled to support 110, such that second ultrasonic-sensor roller 160B is translationally movable relative to support 110. Second ultrasonic-sensor roller 160B is rotatable relative to support 110 and is located between first ultrasonic-sensor roller 160A and second nozzle 112B.

End effector 100 provides for depositing adhesive 102, through first-nozzle-body outlet port 116A and second-nozzle-body outlet port 116B, into corresponding spaces (e.g., first space 104A and second space 104B) between first part 122 and second part 124. First-nozzle separator plate 114A promotes separation between first part 122 and second part 124 to create first space 104A. Similarly, second-nozzle separator plate 114B promotes separation between first part 122 and second part 124 to create second space 104B. First-nozzle-body outlet port 116A and first-nozzle separator plate 114A enable adhesive 102 to be deposited, through first-nozzle-body outlet port 116A, into first space 104A when first-nozzle separator plate 114A is located between and is separating first part 122 and second part 124. Accordingly, a configuration of first-nozzle-body outlet port 116A and first-nozzle separator plate 114A maintains separation between first part 122 and second part 124 as adhesive 102 is deposited, through first-nozzle-body outlet port 116A, between first part 122 and second part 124. Likewise, second-nozzle-body outlet port 116B and second-nozzle separator plate 114B enable adhesive 102 to be deposited, through second-nozzle-body outlet port 116B, into second space 104B when second-nozzle separator plate 114B is located between and is separating first part 122 and second part 124. Accordingly, a configuration of second-nozzle-body outlet port 116B and second-nozzle separator plate 114B maintains separation between first part 122 and second part 124 as adhesive 102 is deposited, through second-nozzle-body outlet port 116B, between first part 122 and second part 124. First ultrasonic-sensor roller 160A and second ultrasonic-sensor roller 160B, being rotatable relative to support 110, such as about first-sensor axis 151 and second-sensor axis 153, respectively, enables first ultrasonic-sensor roller 160A and second ultrasonic-sensor roller 160B to roll along second part 124 as end effector 100 moves relative to first part 122 and second part 124. Also, first ultrasonic-sensor roller 160A, being located between first nozzle 112A and second nozzle 112B, and second ultrasonic-sensor roller 160B, being located between first ultrasonic-sensor roller 160A and second nozzle 112B, provides for detection of adhesive between first part 122 and second part 124, by first ultrasonic-sensor roller 160A and second ultrasonic-sensor roller 160B, at locations away from first-nozzle-body outlet port 116A and second-nozzle-body outlet port 116B, which helps to monitor the spread of adhesive 102 away from first-nozzle-body outlet port 116A and second-nozzle-body outlet port 116B.

Generally, end effector 100 functions as an automated end effector that is operably coupled with an end of a robot (not shown) or other robotic arm mechanism and that is designed to interact with the environment by depositing adhesive 102 between first part 122 and second part 124.

In some examples, first-nozzle separator plate 114A is made of a material that is more flexible than a material of first part 122 and a material of second part 124, which promotes compliancy of first-nozzle separator plate 114A when inserting first-nozzle separator plate 114A between first part 122 and second part 124. Similarly, in some examples, second-nozzle separator plate 114B is made of a material that is more flexible than the material of first part 122 and the material of second part 124, which promotes compliancy of second-nozzle separator plate 114B when inserting second-nozzle separator plate 114B between first part 122 and second part 124.

According to certain examples, each one of first-nozzle separator plate 114A and second-nozzle separator plate 114B includes a beveled tip portion, which promotes ease in inserting first-nozzle separator plate 114A and second-nozzle separator plate 114B between first part 122 and second part 124.

In certain examples, adhesive 102 is one of an epoxy adhesive, a polyurethane adhesive, polyamide adhesives, or the like. Moreover, when delivered to and through first-nozzle-body outlet port 116A and second-nozzle-body outlet port 116B, adhesive 102 is in a flowable state, such as a glutinous, viscous, or extrudable state). After being deposited between first part 122 and second part 124, adhesive is allowed to harden (e.g., via curing or air drying) to form the adhesive bond between first part 122 and second part 124.

Referring generally to FIG. 1 and particularly to, e.g., FIGS. 2A-6 for illustrative purposes only and not by way of limitation, the following portion of this paragraph delineates example 2 of the subject matter, disclosed herein. According to example 2, which encompasses example 1, above, first ultrasonic-sensor roller 160A is configured to generate first-roller-sensor ultrasonic signal 162A. Second ultrasonic-sensor roller 160B is configured to generate second-roller-sensor ultrasonic signal 162B.

First-roller-sensor ultrasonic signal 162A and second-roller-sensor ultrasonic signal 162B enable detection of presence of adhesive 102, at two different locations, between first part 122 and second part 124. Moreover, first-roller-sensor ultrasonic signal 162A and second-roller-sensor ultrasonic signal 162B are configured to penetrate through first part 122 or second part 124, which enables first ultrasonic-sensor roller 160A and second ultrasonic-sensor roller 160B, respectively, to detect the presence of adhesive 102 between first part 122 and second part 124. First-roller-sensor ultrasonic signal 162A is generated by an ultrasonic sensor (e.g., an ultrasonic sensor array), housed within first ultrasonic-sensor roller 160A, and second-roller-sensor ultrasonic signal 162B is generated by an ultrasonic sensor (e.g., an ultrasonic sensor array), housed within second ultrasonic-sensor roller 160B. The ultrasonic sensor of one or both of first ultrasonic-sensor roller 160A and second ultrasonic-sensor roller 160B is an annular ultrasonic sensor, in some examples.

Referring generally to FIG. 1 and particularly to, e.g., FIGS. 2A-6 for illustrative purposes only and not by way of limitation, the following portion of this paragraph delineates example 3 of the subject matter, disclosed herein. According to example 3, which encompasses example 1 or 2, above, end effector 100 further comprises roller 118, coupled to support 110. Roller 118 is rotatable relative to support 110 and is located between first ultrasonic-sensor roller 160A and second ultrasonic-sensor roller 160B.

Roller 118 helps prevent movement of second part 124 away from first part 122 beyond a predetermined distance when adhesive is being dispensed between first part 122 and second part 124. Accordingly, roller 118 provides a force, directed toward first part 122, against second part 124 that counters a force, directed away from first part 122, generated by adhesive 102 filling the space between first part 122 and second part 124, which helps to keep a thickness of the space, when filled, below a maximum thickness. Additionally, roller 118, being rotatable relative to support 110, enables roller 118 to roll along second part 124 as end effector 100 moves relative to first part 122 and second part 124. Roller 118 is fixed to support 110, such that roller 118 cannot translationally move relative to support 110.

Referring generally to FIG. 1 and particularly to, e.g., FIGS. 2A-6 for illustrative purposes only and not by way of limitation, the following portion of this paragraph delineates example 4 of the subject matter, disclosed herein. According to example 4, which encompasses any one of examples 1 to 3, above, end effector 100 further comprises first-nozzle biasing member 148A, which is configured to bias first nozzle 112A away from support 110. End effector 100 also comprises second-nozzle biasing member 148B, which is configured to bias second nozzle 112B away from support 110.

First-nozzle biasing member 148A, being configured to bias first nozzle 112A away from support 110, and second-nozzle biasing member 148B, being configured to bias second nozzle 112B away from support 110, promotes constant engagement of first-nozzle separator plate 114A and second-nozzle separator plate 114B, respectively, with first part 122, as end effector 100 moves relative to first part 122 and second part 124, and as adhesive 102 is dispensed through first-nozzle-body outlet port 116A and second-nozzle-body outlet port 116B. In some examples, when engaged with first part 122, first-nozzle separator plate 114A and second-nozzle separator plate 114B are flush against first part 122.

As used herein, "to bias" means to continuously apply a force, which may or may not have a constant magnitude, but is always applied in the same direction and has a magnitude greater than zero.

Referring generally to FIG. 1 and particularly to, e.g., FIGS. 2A-6 for illustrative purposes only and not by way of limitation, the following portion of this paragraph delineates example 5 of the subject matter, disclosed herein. According to example 5, which encompasses any one of examples 1 to 4, above, end effector 100 further comprises first arm 128A, which couples first nozzle 112A to support 110. End effector 100 also comprises second arm 128B, which couples second nozzle 112B to support 110. First arm 128A is pivotable, relative to support 110, such that first arm 128A is selectively pivotable to one of a first-arm disengaged position or a first-arm engaged position. Second arm 128B is pivotable, relative to support 110, such that second arm 128B is selectively pivotable to one of a second-arm disengaged position or a second-arm engaged position. First-nozzle separator plate 114A is closer to second-nozzle separator plate 114B when first arm 128A is in the first-arm engaged position and second arm 128B is in the second-arm engaged position than when first arm 128A is in the first-arm disengaged position and second arm 128B is in the second-arm disengaged position.

First arm 128A, being selectively pivotable to move first arm 128A to one of the first-arm disengaged position or the first-arm engaged position, enables first-nozzle separator plate 114A to be selectively insertable into or retractable out from space between first part 122 and second part 124 independent of movement of support 110. Similarly, second arm 128B, being selectively pivotable to move second arm 128B to one of the second-arm disengaged position or the second-arm engaged position, enables second-nozzle separator plate 114B to be selectively insertable into or retractable out from space between first part 122 and second part 124 independent of movement of support 110. First-nozzle separator plate 114A, being closer to second-nozzle separator plate 114B, when first arm 128A is in the first-arm engaged position and second arm 128B is in the second-arm engaged position than when first arm 128A is in the first-arm disengaged position and second arm 128B is in the second-arm disengaged position, provides end effector 100 with more freedom for maneuvering, relative to first part 122 and second part 124, as end effector 100 approaches first part 122 and second part 124 to dispense adhesive 102 between first part 122 and second part 124 and as end effector 100 is moved away from first part 122 and second part 124 after adhesive 102 has been dispensed between first part 122 and second part 124.

Referring generally to FIG. 1 and particularly to, e.g., FIGS. 2A-6 for illustrative purposes only and not by way of limitation, the following portion of this paragraph delineates example 6 of the subject matter, disclosed herein. According to example 6, which encompasses example 5, above, end effector 100 further comprises first-nozzle biasing member 148A, which is configured to bias first nozzle 112A away from support 110, and second-nozzle biasing member 148B, which is configured to bias second nozzle 112B away from support 110. First-nozzle biasing member 148A is a compression spring, coupled to first nozzle 112A and to first arm 128A. Second-nozzle biasing member 148B is a compression spring, coupled to second nozzle 112B and to second arm 128B.

First-nozzle biasing member 148A, being coupled to first nozzle 112A and to first arm 128A, enables first nozzle 112A to be biased relative to first arm 128A, which helps in achieving a controlled initial engagement between first-nozzle separator plate 114A and first part 122 as first arm 128A is moved into the first-arm engaged position, and helps to keep first-nozzle separator plate 114A in contact with first part 122 as adhesive 102 is being dispensed. Similarly, second-nozzle biasing member 148B, being coupled to second nozzle 112B and to second arm 128B, enables second nozzle 112B to be biased relative to second arm 128B, which helps in achieving a controlled initial engagement between second-nozzle separator plate 114B and first part 122 as second arm 128B is moved into the second-arm engaged position, and helps to keep second-nozzle separator plate 114B in contact with first part 122 as adhesive is being dispensed. Compression springs provide a simple, predictable, and reliable means for biasing first nozzle 112A and second nozzle 112B away from support 110. Additionally, compression springs reduce complexity and reduce spatial constraints by moving spring connection points away from first-nozzle-body outlet port 116A and second-nozzle-body outlet port 116B. However, in some example, each one of first-nozzle biasing member 148A and second-nozzle biasing member 148B is a different type of biasing member, such as a tension spring.

Referring generally to FIG. 1 and particularly to, e.g., FIGS. 2A and 3-6 for illustrative purposes only and not by way of limitation, the following portion of this paragraph delineates example 7 of the subject matter, disclosed herein. According to example 7, which encompasses example 5 or 6, above, end effector 100 further comprises first-arm axis 146. First arm 128A is pivotable, relative to support 110, about first-arm axis 146. Furthermore, second arm 128B is pivotable, relative to support 110, about first-arm axis 146.

First arm 128A and second arm 128B, being pivotable about first-arm axis 146, promotes simple and reliable positioning of first nozzle 112A and second nozzle 112B relative to each other.

In some examples, the subject matter, disclosed herein includes axes, planes, and rays. Such axes, planes, and rays, unless otherwise indicated, are virtual (imaginary) features, used to define certain aspects of the subject matter. As used herein, "virtual" means having the attributes of an entity without possessing its physical form. For example, a virtual reference plane is an intangible or imaginary plane, rather than a physical one, with respect to which, e.g., location and/or orientation of other physical and/or intangible entities can be defined.

Referring generally to FIG. 1 and particularly to, e.g., FIGS. 2A and 3-6 for illustrative purposes only and not by way of limitation, the following portion of this paragraph delineates example 8 of the subject matter, disclosed herein. According to example 8, which encompasses example 7, above, first arm 128A is offset from second arm 128B along first-arm axis 146.

First arm 128A and second arm 128B, being offset from each other along first-arm axis 146, enables first nozzle 112A and second nozzle 112B to be offset in a direction, parallel with first-arm axis 146.

Referring generally to FIG. 1 and particularly to, e.g., FIGS. 2A and 3-6 for illustrative purposes only and not by way of limitation, the following portion of this paragraph delineates example 9 of the subject matter, disclosed herein. According to example 9, which encompasses example 7 or 8, above, end effector 100 further comprises roller 118, coupled to support 110. Roller 118 is rotatable relative to support 110 and is located between first ultrasonic-sensor roller 160A and second ultrasonic-sensor roller 160B. End effector 100 additionally comprises roller axis 148. Roller 118 is rotatable about roller axis 148. A virtual plane, containing first-arm axis 146, is perpendicular to a virtual plane, containing roller axis 148.

The virtual plane, containing first-arm axis 146, and the virtual plane, containing roller axis 148, being perpendicular, enable first nozzle 112A and second nozzle 112B to be moved away from and toward second part 124 when roller 118 is oriented by end effector 100 to roll along second part 124.

Figure 2A:
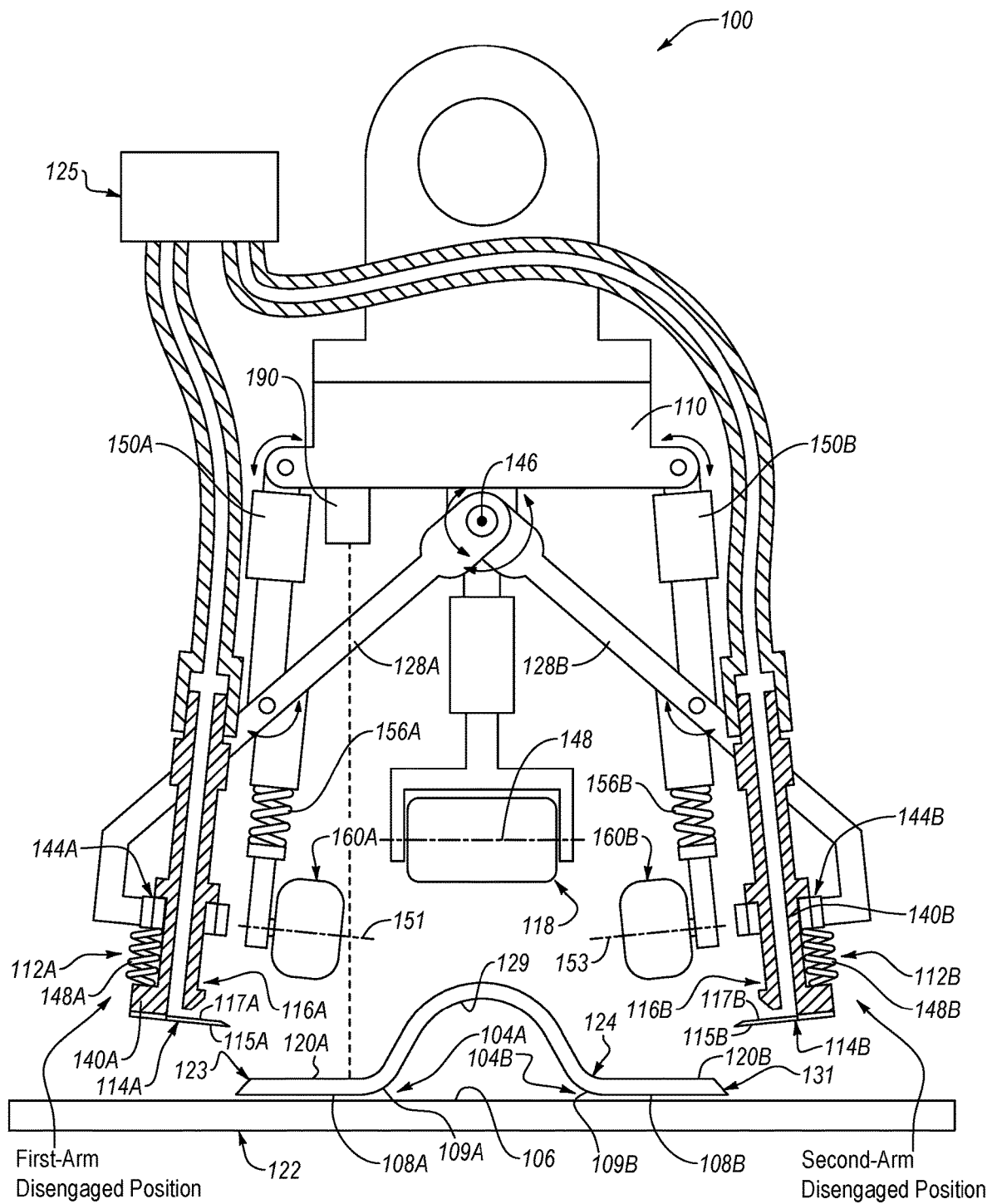
FIG. 2A is a schematic, elevation, sectional view of the end effector of FIG. 1, according to one or more examples of the subject matter, disclosed herein.
Figure 2B:
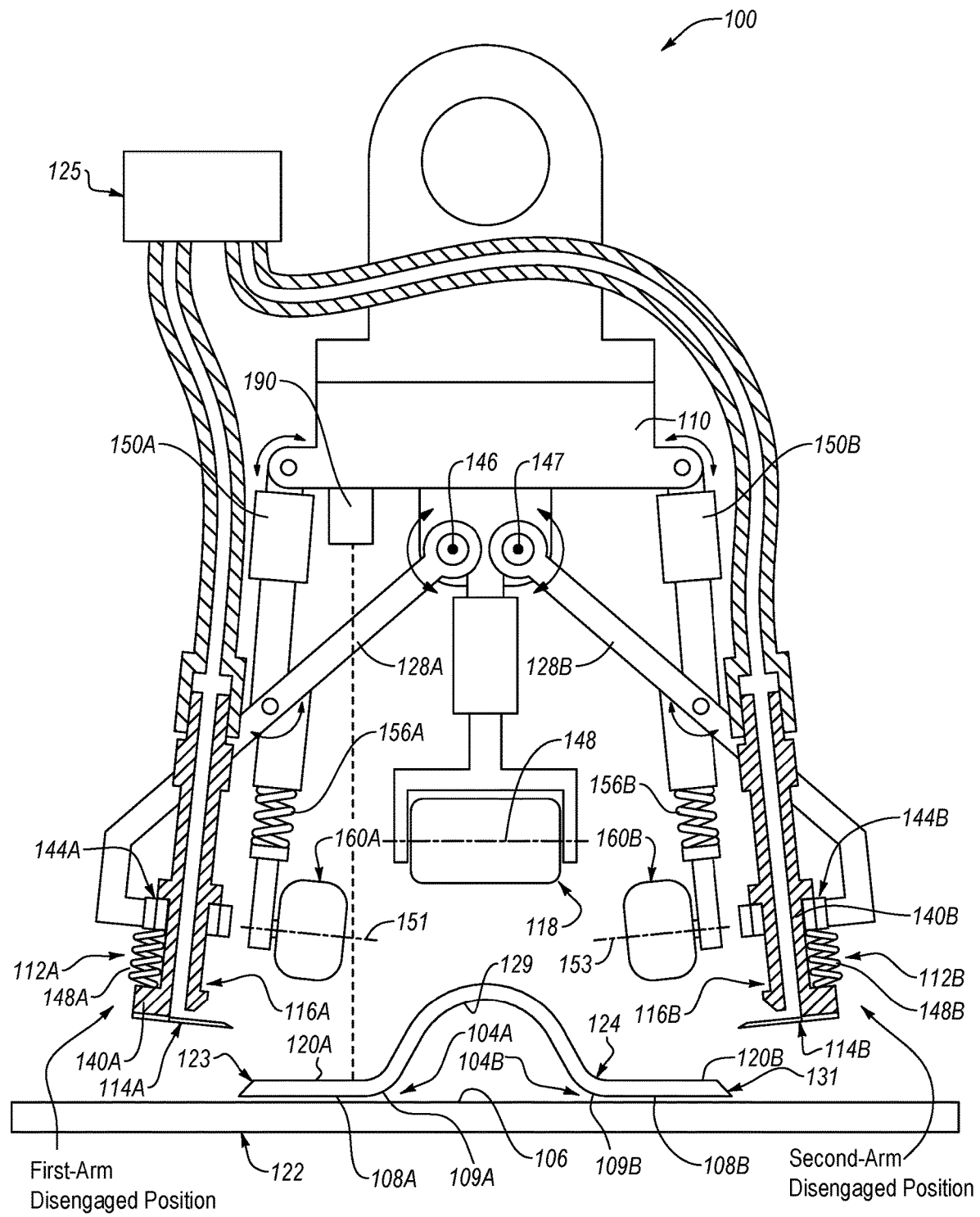
FIG. 2B is a schematic, elevation, sectional view of the end effector of FIG. 1, according to one or more examples of the subject matter, disclosed herein.
Figure 3:
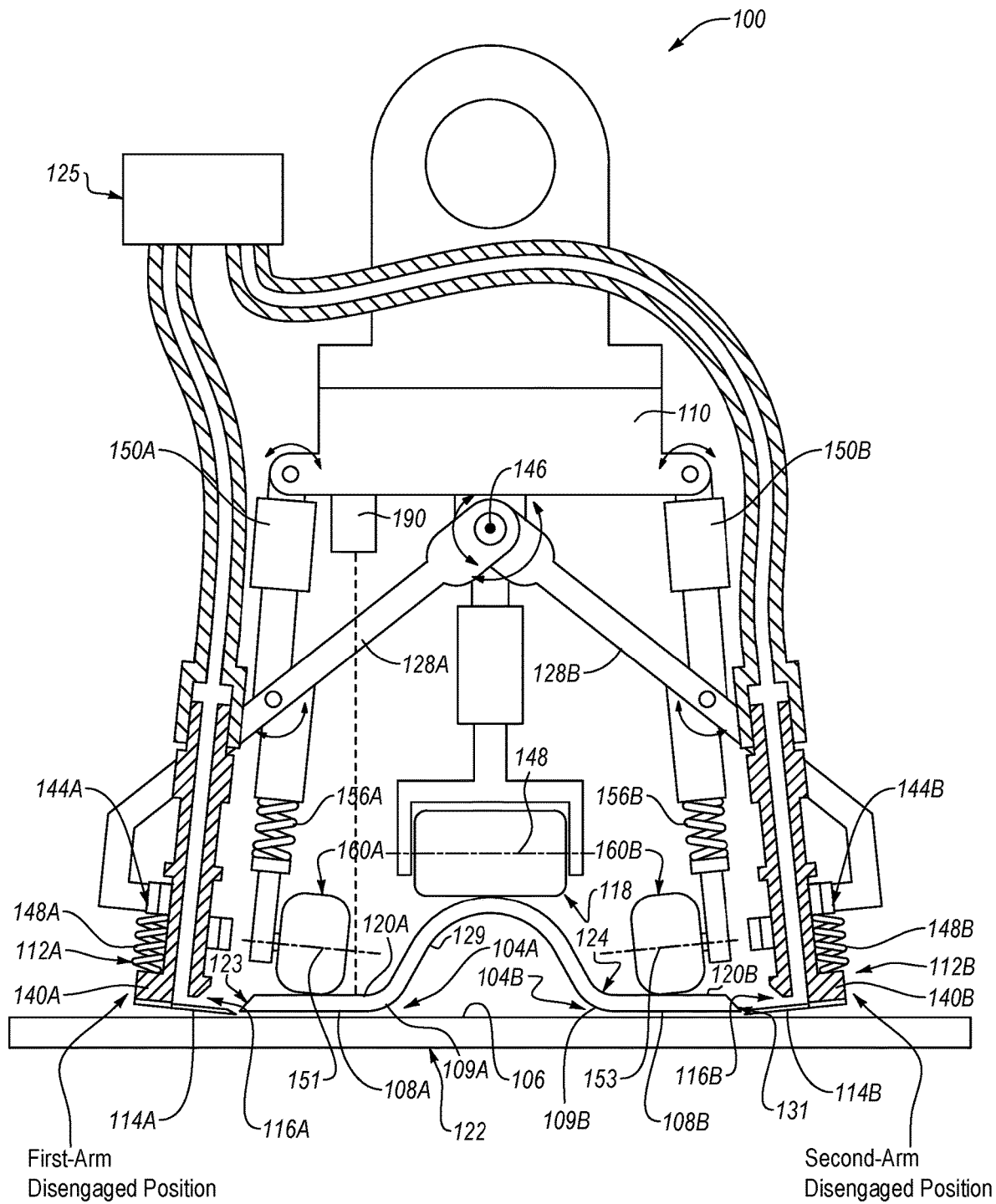
FIG. 3 is a schematic, elevation, sectional view of the end effector of FIG. 1, according to one or more examples of the subject matter, disclosed herein.

Referring generally to FIG. 1 and particularly to, e.g., FIG. 2B for illustrative purposes only and not by way of limitation, the following portion of this paragraph delineates example 10 of the subject matter, disclosed herein. According to example 10, which encompasses example 5 or 6, above, end effector 100 further comprises first-arm axis 146 and second-arm axis 147, which is parallel to first-arm axis 146. First arm 128A is pivotable, relative to support 110, about first-arm axis 146. Second arm 128B is pivotable, relative to support 110, about second-arm axis 147.

First-arm axis 146 and second-arm axis 147, being parallel to each other, enable first arm 128A and second arm 128B to move along a common plane, which promotes alignment between first nozzle 112A and second nozzle 112B as first arm 128A and second arm 128B move, and as adhesive 102 is dispensed through first-nozzle-body outlet port 116A and second-nozzle-body outlet port 116B.

Referring generally to FIG. 1 and particularly to, e.g., FIG. 2B for illustrative purposes only and not by way of limitation, the following portion of this paragraph delineates example 11 of the subject matter, disclosed herein. According to example 11, which encompasses example 10, above, end effector 100 further comprises roller 118, coupled to support 110. Roller 118 is rotatable relative to support 110 and is located between first ultrasonic-sensor roller 160A and second ultrasonic-sensor roller 160B. End effector 100 also comprises roller axis 148. Roller 118 is rotatable about roller axis 148. Virtual planes, containing first-arm axis 146 and second-arm axis 147, respectively, are perpendicular to a virtual plane, containing roller axis 148.

The virtual planes, containing first-arm axis 146 and second-arm axis 147, and the virtual plane, containing roller axis 148, being perpendicular, enable first nozzle 112A and second nozzle 112B to be moved away from and toward second part 124 when roller 118 is oriented by end effector 100 to roll along second part 124.

Referring generally to FIG. 1 and particularly to, e.g., FIGS. 2A-6 for illustrative purposes only and not by way of limitation, the following portion of this paragraph delineates example 12 of the subject matter, disclosed herein. According to example 12, which encompasses any one of examples 5 to 11, above, end effector 100 further comprises positive-pressure source 125. First nozzle 112A is fluidically coupled with positive-pressure source 125. Second nozzle 112B is fluidically coupled with positive-pressure source 125. First-nozzle-body outlet port 116A is configured to dispense adhesive 102 in a first-nozzle dispensing direction. Second-nozzle-body outlet port 116B is configured to dispense adhesive 102 in a second-nozzle dispensing direction. When first arm 128A is in the first-arm engaged position, and when second arm 128B is in the second-arm engaged position, first nozzle 112A and second nozzle 112B are oriented relative to each other such that a ray, corresponding with the first-nozzle dispensing direction, is directed toward and is co-linear with a ray, corresponding with the second-nozzle dispensing direction.

Positive-pressure source 125 enables adhesive 102 to be dispensed from first-nozzle-body outlet port 116A and second-nozzle-body outlet port 116B. Orienting first nozzle 112A and second nozzle 112B relative to each other such that the ray, corresponding with the first-nozzle dispensing direction, is directed toward and is co-linear with the ray, corresponding with the second-nozzle dispensing direction, promotes a uniform or non-staggered distribution of adhesive 102 between first part 122 and second part 124 on opposite sides of second part 124.

First nozzle 112A and second nozzle 112B are fluidically coupled with positive-pressure source 125 via respective tubes, which are flexible, in some examples. Flexible tubes enable first nozzle 112A and second nozzle 112B to move relative to positive-pressure source 125. Positive-pressure source 125 enables adhesive 102 to be dispensed from first-nozzle-body outlet port 116A and second-nozzle-body outlet port 116B. Referring to FIG. 7A, first-nozzle body 140A further comprises first-nozzle-body inlet port 118A and first-nozzle-body channel 121A. First-nozzle-body channel 121A extends through first-nozzle body 140A and fluidically couples together first-nozzle-body inlet port 118A and first-nozzle-body outlet port 116A, such that adhesive 102 from adhesive source 125 flows into first-nozzle-body inlet port 118A, through first-nozzle-body channel 121A, and to first-nozzle-body outlet port 116A. Referring to FIG. 7B, second-nozzle body 140B further comprises second-nozzle-body inlet port 118B and second-nozzle-body channel 121B. Second-nozzle-body channel 121B extends through second-nozzle body 140B and fluidically couples together second-nozzle-body inlet port 118B and second-nozzle-body outlet port 116B, such that adhesive 102 from adhesive source 125 flows into second-nozzle-body inlet port 118B, through second-nozzle-body channel 121B, and to second-nozzle-body outlet port 116B. Although shown as a single unit in FIGS. 2A-6, positive-pressure source 125 includes multiple units, such that first nozzle 112A is considered to be fluidically coupled to one positive-pressure source and second nozzle 112B is considered to be fluidically coupled to another positive-pressure source. Positive-pressure source 125 is a pump in certain examples.

Referring generally to FIG. 1 and particularly to, e.g., FIGS. 2A-6 for illustrative purposes only and not by way of limitation, the following portion of this paragraph delineates example 13 of the subject matter, disclosed herein. According to example 13, which encompasses any one of examples 5 to 12, above, first arm 128A couples first ultrasonic-sensor roller 160A to support 110. Second arm 128B couples second ultrasonic-sensor roller 160B to support 110.

First arm 128A, coupling first ultrasonic-sensor roller 160A to support 110, and second arm 128B, coupling second ultrasonic-sensor roller 160B to support 110, enables first ultrasonic-sensor roller 160A to co-move with first arm 128A and enables second ultrasonic-sensor roller 160B to co-move with second arm 128B. Co-movement of first ultrasonic-sensor roller 160A and first arm 128A, and co-movement of second ultrasonic-sensor roller 160B and second arm 128B, promote proper positioning of first ultrasonic-sensor roller 160A and second ultrasonic-sensor roller 160B for detecting adhesive 102 when first nozzle 112A and second nozzle 112B are positioned to dispense adhesive 102 between first part 122 and second part 124.

Referring generally to FIG. 1 and particularly to, e.g., FIGS. 2A-6 for illustrative purposes only and not by way of limitation, the following portion of this paragraph delineates example 14 of the subject matter, disclosed herein. According to example 14, which encompasses example 13, above, end effector 100 further comprises first-sensor biasing member 156A, which is coupled to first arm 128A and is configured to bias first ultrasonic-sensor roller 160A away from support 110, and second-sensor biasing member 156B, which is coupled to second arm 128B and is configured to bias second ultrasonic-sensor roller 160B away from support 110.

First-sensor biasing member 156A, being configured to bias first ultrasonic-sensor roller 160A away from support 110, and second-sensor biasing member 156B, being configured to bias second ultrasonic-sensor roller 160B away from support 110, promotes constant engagement of first ultrasonic-sensor roller 160A and second ultrasonic-sensor roller 160B, respectively, with second part 124, as end effector 100 moves relative to first part 122 and second part 124, and as adhesive 102 is dispensed through first-nozzle-body outlet port 116A and second-nozzle-body outlet port 116B. As shown, in some examples, each one of first-sensor biasing member 156A and second-sensor biasing member 156B is a compression spring. In one or more examples, each one of first-sensor biasing member 156A and second-sensor biasing member 156B is a torsional spring or other type of biasing member.

Figure 4:
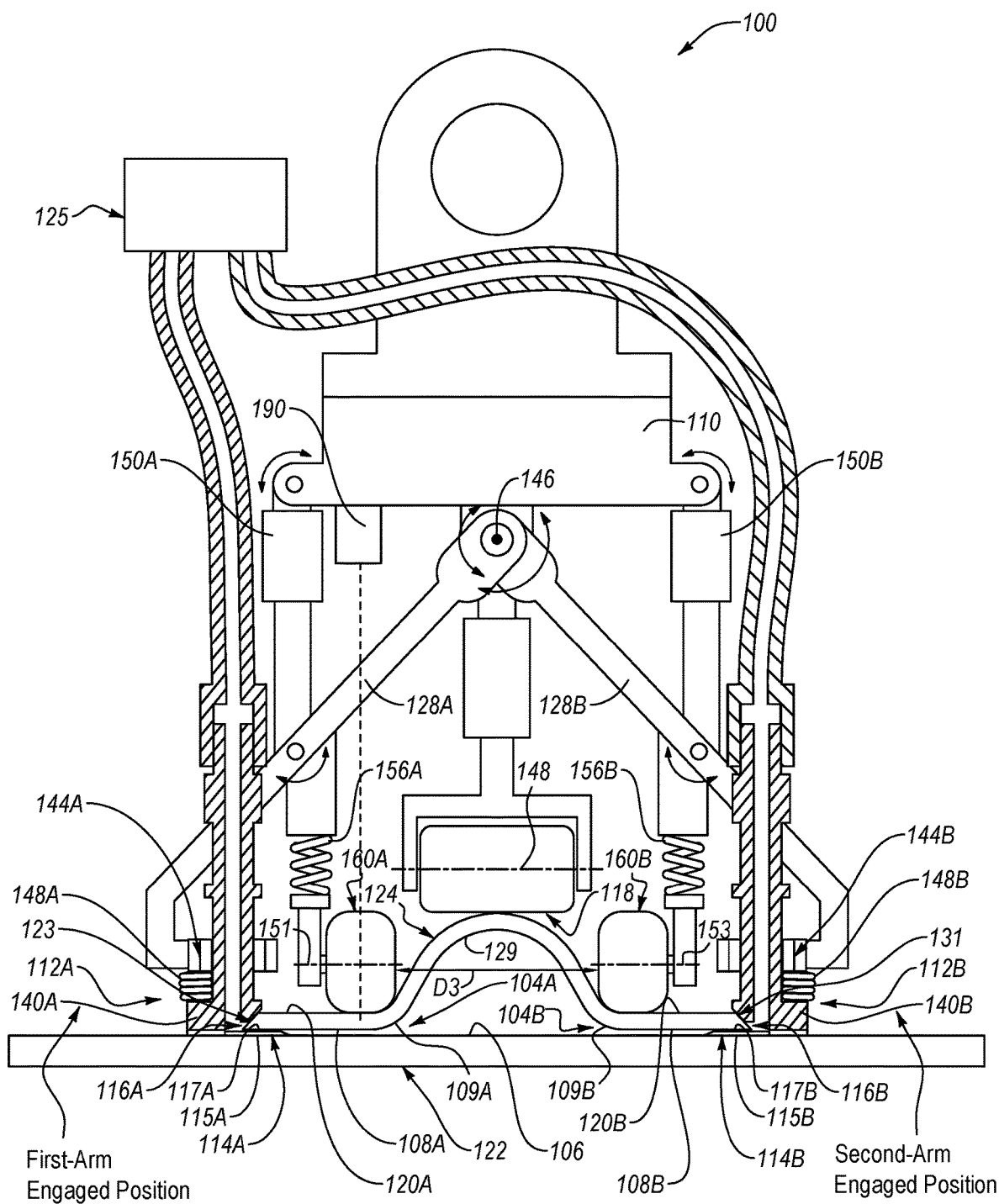
FIG. 4 is a schematic, elevation, sectional view of the end effector of FIG. 1, according to one or more examples of the subject matter, disclosed herein.

Referring generally to FIG. 1 and particularly to, e.g., FIGS. 2A and 4 for illustrative purposes only and not by way of limitation, the following portion of this paragraph delineates example 15 of the subject matter, disclosed herein. According to example 15, which encompasses any one of examples 5 to 14, above, first-nozzle separator plate 114A comprises first-nozzle-separator-plate first-part engagement surface 115A and first-nozzle-separator-plate second-part engagement surface 117A. First-nozzle-separator-plate first-part engagement surface 115A and first-nozzle-separator-plate second-part engagement surface 117A are parallel to each other. Second-nozzle separator plate 114B comprises second-nozzle-separator-plate first-part engagement surface 115B and second-nozzle-separator-plate second-part engagement surface 117B. Second-nozzle-separator-plate first-part engagement surface 115B and second-nozzle-separator-plate second-part engagement surface 117B are parallel to each other. When first arm 128A is in the first-arm disengaged position, and second arm 128B is in the second-arm disengaged position, first-nozzle-separator-plate first-part engagement surface 115A and second-nozzle-separator-plate first-part engagement surface 115B are non-coplanar. When first arm 128A is in the first-arm engaged position, and second arm 128B is in the second-arm engaged position, first-nozzle-separator-plate first-part engagement surface 115A and second-nozzle-separator-plate first-part engagement surface 115B are coplanar.

First-nozzle-separator-plate first-part engagement surface 115A and second-nozzle-separator-plate first-part engagement surface 115B, being non-coplanar when first arm 128A is in the first-arm disengaged position and second arm 128B is in the second-arm disengaged position, helps to reduce an overall footprint (e.g., width) of end effector 100, which enables end effector 100 to reach and occupy tight spaces as needed.

Figure 5:
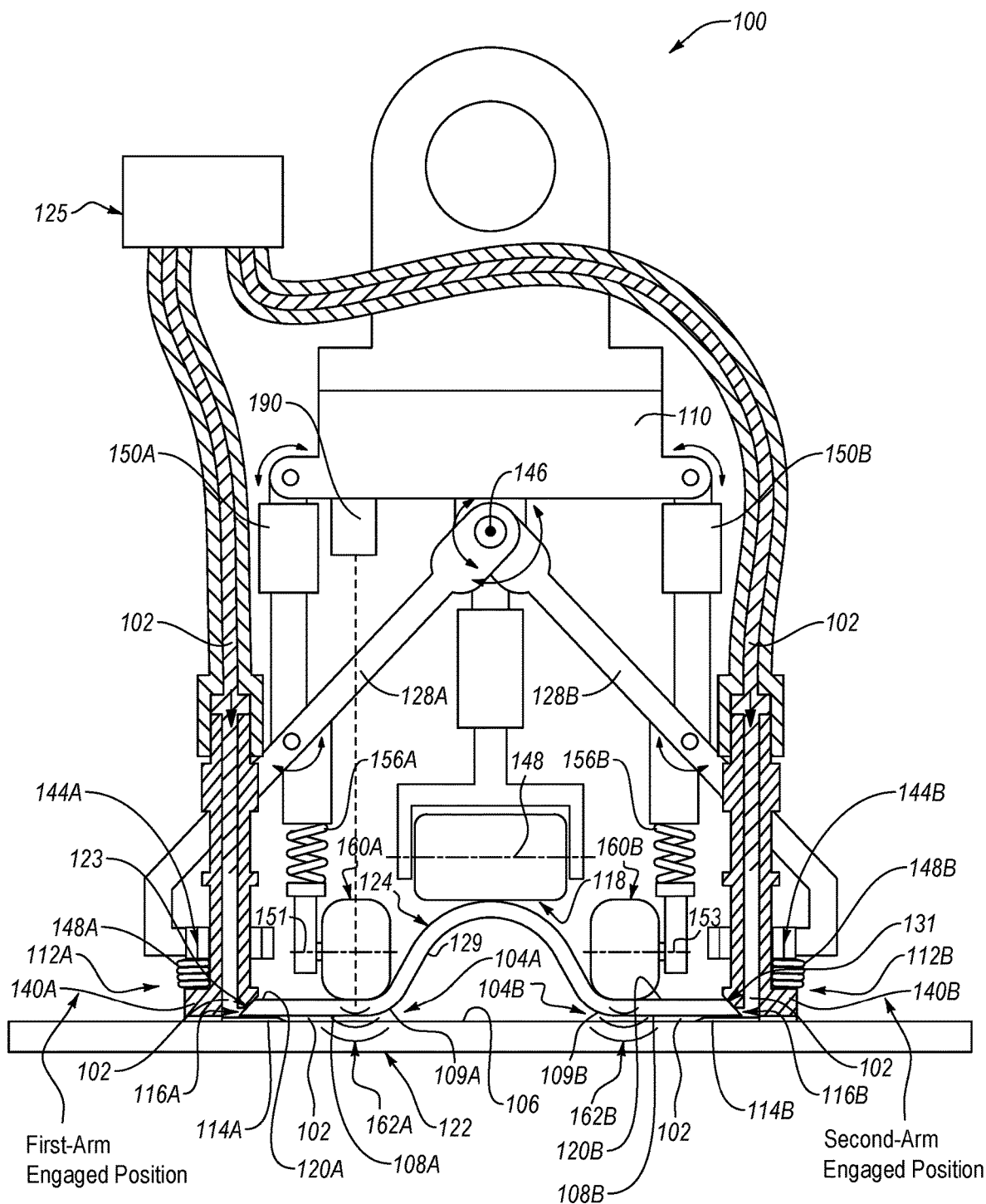
FIG. 5 is a schematic, elevation, sectional view of the end effector of FIG. 1, according to one or more examples of the subject matter, disclosed herein.
Figure 6:
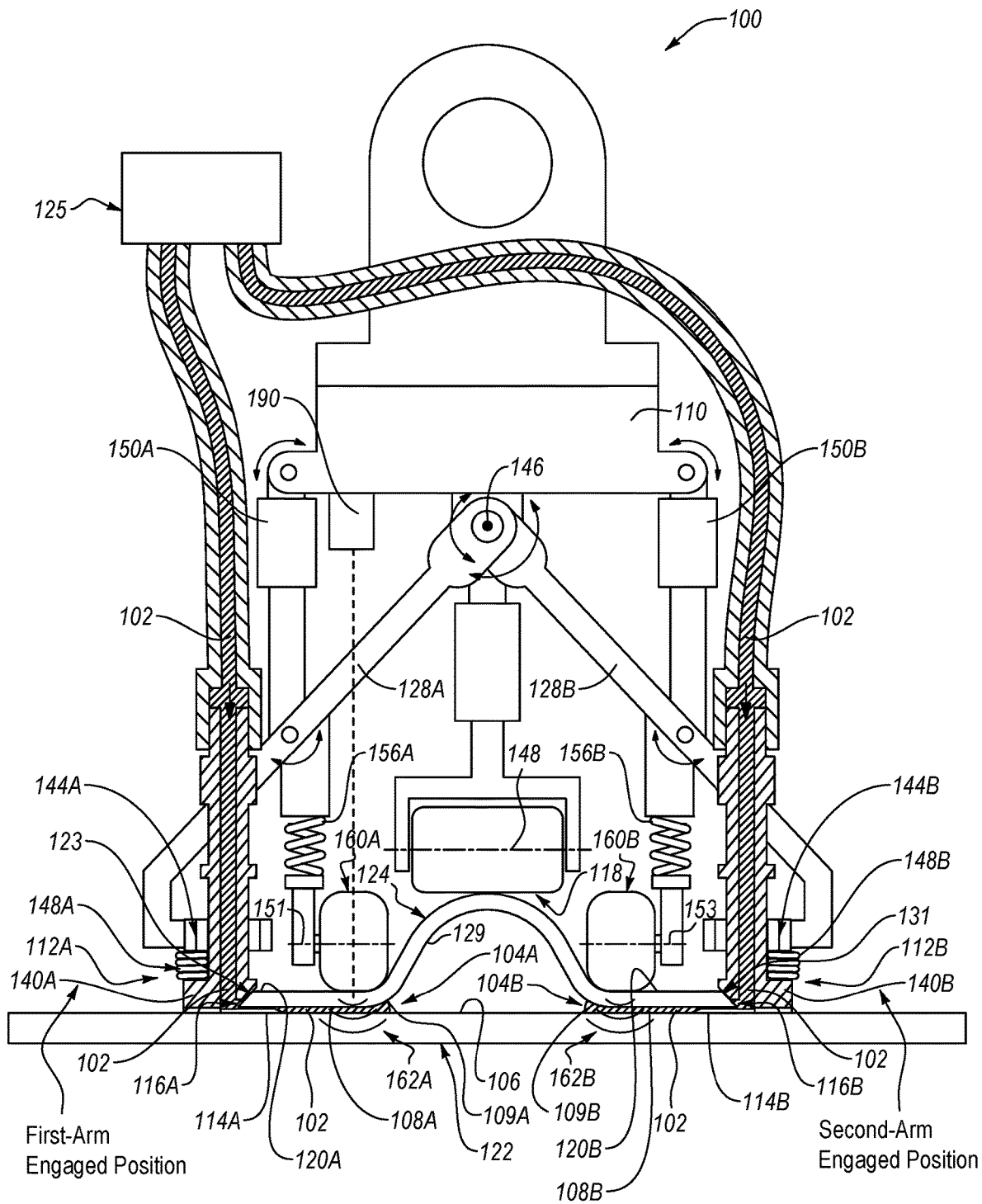
FIG. 6 is a schematic, elevation, sectional view of the end effector of FIG. 1, according to one or more examples of the subject matter, disclosed herein.
Figure 7A:
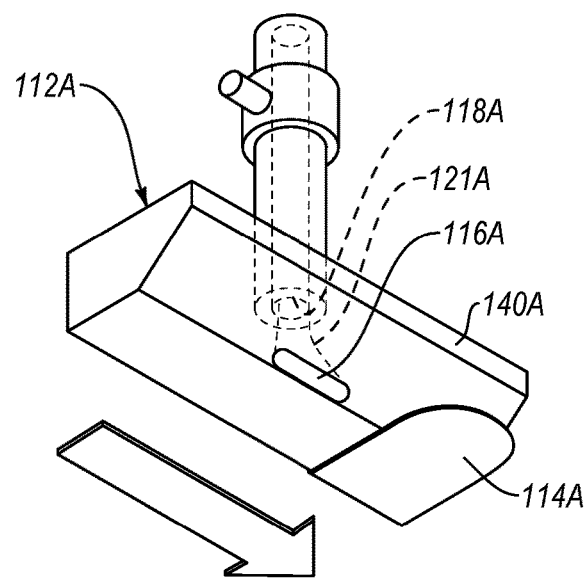
FIG. 7A is a schematic, perspective view of a first nozzle of the apparatus of FIG. 1, according to one or more examples of the subject matter, disclosed herein.
Figure 7B:
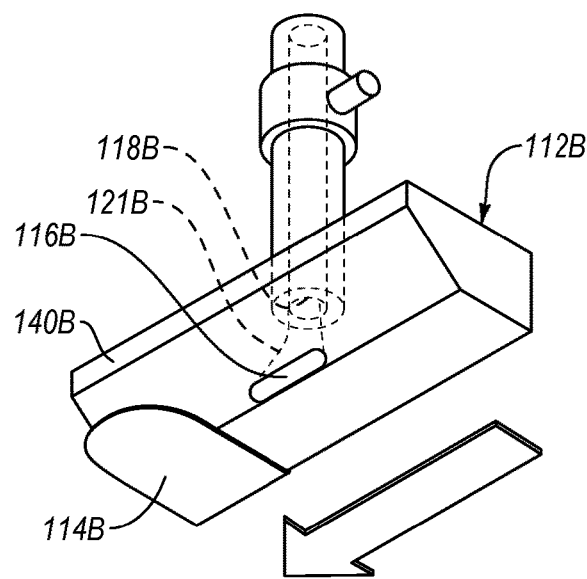
FIG. 7B is a schematic, perspective view of a second nozzle of the apparatus of FIG. 1, according to one or more examples of the subject matter, disclosed herein.

Referring generally to FIG. 1 and particularly to, e.g., FIGS. 4-6 for illustrative purposes only and not by way of limitation, the following portion of this paragraph delineates example 16 of the subject matter, disclosed herein. According to example 16, which encompasses any one of examples 5 to 15, above, when first arm 128A is in the first-arm engaged position, and second arm 128B is in the second-arm engaged position, a minimum distance between first-nozzle separator plate 114A and second-nozzle separator plate 114B is less than a minimum distance between first-nozzle-body outlet port 116A and second-nozzle-body outlet port 116B, and a minimum distance between first ultrasonic-sensor roller 160A and second ultrasonic-sensor roller 160B is less than the minimum distance between first-nozzle separator plate 114A and second-nozzle separator plate 114B.

The minimum distance between first-nozzle separator plate 114A and second-nozzle separator plate 114B, being less than the minimum distance between first-nozzle-body outlet port 116A and second-nozzle-body outlet port 116B, enables first-nozzle separator plate 114A and second-nozzle separator plate 114B to be positioned between first part 122 and second part 124 when first-nozzle-body outlet port 116A and second-nozzle-body outlet port 116B are in position to dispense adhesive 102 between first part 122 and second part 124, which promotes separation of second part 124 from first part 122 by first-nozzle separator plate 114A and second-nozzle separator plate 114B before adhesive 102 is dispensed. Additionally, the minimum distance between first ultrasonic-sensor roller 160A and second ultrasonic-sensor roller 160B, being less than the minimum distance between first-nozzle separator plate 114A and second-nozzle separator plate 114B, enables first ultrasonic-sensor roller 160A and second ultrasonic-sensor roller 160B to detect adhesive 102 at locations beyond first-nozzle separator plate 114A and second-nozzle separator plate 114B.

Referring generally to FIG. 1 and particularly to, e.g., FIGS. 2A-6 for illustrative purposes only and not by way of limitation, the following portion of this paragraph delineates example 17 of the subject matter, disclosed herein. According to example 17, which encompasses any one of examples 5 to 11, above, end effector 100 further comprises positive-pressure source 125. First nozzle 112A is fluidically coupled with positive-pressure source 125. Furthermore, second nozzle 112B is fluidically coupled with positive-pressure source 125.

Positive-pressure source 125 enables adhesive 102 to be dispensed from first-nozzle-body outlet port 116A and second-nozzle-body outlet port 116B.

Referring generally to FIG. 1 and particularly to, e.g., FIGS. 2A-6 for illustrative purposes only and not by way of limitation, the following portion of this paragraph delineates example 18 of the subject matter, disclosed herein. According to example 18, which encompasses example 17, above, first-nozzle-body outlet port is configured to dispense adhesive in a first-nozzle dispensing direction. Second-nozzle-body outlet port is configured to dispense adhesive 102 in a second-nozzle dispensing direction. First-nozzle separator plate 114A extends from first-nozzle body 140A in the first-nozzle dispensing direction. Second-nozzle-body outlet port is configured to dispense adhesive 102 in a second-nozzle dispensing direction. Second-nozzle separator plate 114B extends from second-nozzle body 140B in the second-nozzle dispensing direction. When first arm 128A is in the first-arm engaged position, and second arm 128B is in the second-arm engaged position, first nozzle 112A and second nozzle 112B are oriented relative to each other such that a ray, corresponding with the first-nozzle dispensing direction, and a ray, corresponding with the second-nozzle dispensing direction, are co-planar.

Orienting first nozzle 112A and second nozzle 112B relative to each other such that the ray, corresponding with the first-nozzle dispensing direction, and the ray, corresponding with the second-nozzle dispensing direction, are co-planar enables the distribution of adhesive 102 between first part 122 and second part 124 on opposite sides of second part 124 to be uniform or non-uniform, or staggered or non-staggered.

Referring generally to FIG. 1 and particularly to, e.g., FIGS. 2A-6 for illustrative purposes only and not by way of limitation, the following portion of this paragraph delineates example 19 of the subject matter, disclosed herein. According to example 19, which encompasses any one of examples 5 to 18, above, end effector 100 further comprises first linear slide 144A, which couples first nozzle 112A to first arm 128A such that first nozzle 112A is movable relative to first arm 128A. End effector 100 additionally comprises second linear slide 144B, which couples second nozzle 112B to second arm 128B such that second nozzle 112B is movable relative to second arm 128B.

First linear slide 144A enables and ensures only linear movement of first nozzle 112A, relative to first arm 128A, and second linear slide 144B, enables and ensures only linear movement of second nozzle 112B, relative to second arm 128B. Each one of first linear slide 144A and second linear slide 144B is a component, such as linear-motion bearings, that provides for smooth and low-friction motion along a single axis. In some examples, end effector 100 additionally includes a first gimbal, coupled to first arm 128A and to which first linear slide 144A is coupled, and a second gimbal, coupled to second arm 128B and to which second linear slide 144B is coupled. First gimbal and second gimbal facilitate movement of first linear slide 144A and second linear slide 144B, respectively, about multiple axes, which helps to orient first nozzle 112A and second nozzle 112B relative to first part 122 as first arm 128A and second arm 128B are pivoted into the first-arm engaged position and the second-arm engaged position, respectively.

Referring generally to FIG. 1 and particularly to, e.g., FIGS. 2A-6 for illustrative purposes only and not by way of limitation, the following portion of this paragraph delineates example 20 of the subject matter, disclosed herein. According to example 20, which encompasses any one of examples 5 to 19, above, end effector 100 further comprises first actuator 150A, coupled to support 110 and to first arm 128A. First actuator 150A is selectively actuatable such that first arm 128A pivots to one of the first-arm disengaged position or the first-arm engaged position. End effector 100 also comprises second actuator 150B, coupled to support 110 and second arm 128B. Second actuator 150B is selectively actuatable such that second arm 128B pivots to one of the second-arm disengaged position or the second-arm engaged position.

First actuator 150A and second actuator 150B enable selective pivoting of first arm 128A and second arm 128B, respectively. In some examples, each one of first actuator 150A and second actuator 150B is a selectively controllable actuator powered by one or more of hydraulic power, electric power, electromagnetic power, pneumatic power, and the like.

Referring generally to FIG. 1 and particularly to, e.g., FIGS. 2A-10 for illustrative purposes only and not by way of limitation, the following portion of this paragraph delineates example 21 of the subject matter, disclosed herein. According to example 21, which encompasses any one of examples 1 to 11, above, first-nozzle-body outlet port 116A is configured to dispense adhesive 102 in a first-nozzle dispensing direction. Second-nozzle-body outlet port 116B is configured to dispense adhesive 102 in a second-nozzle dispensing direction. First-nozzle separator plate 114A extends from first-nozzle body 140A in the first-nozzle dispensing direction. Second-nozzle separator plate 114B extends from second-nozzle body 140B in the second-nozzle dispensing direction. First-nozzle separator plate 114A is offset from first-nozzle-body outlet port 116A along a first-nozzle-body axis that is perpendicular to a ray, corresponding to the first-nozzle dispensing direction. Second-nozzle separator plate 114B is offset from second-nozzle-body outlet port 116B along a second-nozzle-body axis that is perpendicular to a ray, corresponding to the second-nozzle dispensing direction.

First-nozzle separator plate 114A, being offset from first-nozzle-body outlet port 116A along the first-nozzle-body axis, enables first-nozzle-body outlet port 116A to trail first-nozzle separator plate 114A as end effector 100 moves relative to first part 122 and second part 124 (e.g., in the direction indicated by a directional arrow in FIGS. 7A-10), and as adhesive 102 is dispensed from first-nozzle-body outlet port 116A between first part 122 and second part 124. Similarly, second-nozzle separator plate 114B, being offset from second-nozzle-body outlet port 116B along the second-nozzle-body axis, enables second-nozzle-body outlet port 116B to trail second-nozzle separator plate 114B as end effector 100 moves relative to first part 122 and second part 124 (e.g., in the direction indicated by a directional arrow in FIGS. 7A-10), and as adhesive 102 is dispensed between first part 122 and second part 124 through second-nozzle-body outlet port 116B.

Referring generally to FIG. 1 and particularly to, e.g., FIGS. 2A-6 for illustrative purposes only and not by way of limitation, the following portion of this paragraph delineates example 22 of the subject matter, disclosed herein. According to example 22, which encompasses any one of examples 1 to 21, above, end effector 100 further comprises proximity sensor 190, which is coupled to support 110 and is configured to emit an electromagnetic field and detect changes in the electromagnetic field.

Proximity sensor 190 provides for the determination of the distance of end effector 100 from one or both of first part 122 and second part 124, which helps end effector 100 to be moved into a proper position, relative to first part 122 and second part 124, for dispensing adhesive 102 between first part 122 and second part 124, and to avoid damaging first part 122 or second part 124, inadvertently impacting first part 122 or second part 124 with end effector 100, as end effector 100 is moved toward first part 122 and second part 124 in preparation for an adhesive dispensing operation.

Referring generally to FIGS. 11A, 11B, and 11C and particularly to, e.g., FIGS. 2A-10 for illustrative purposes only and not by way of limitation, the following portion of this paragraph delineates example 23 of the subject matter, disclosed herein. According to example 24, disclosed herein is method 200 of using end effector 100 of example 1 for adhesively attaching first part 122, which comprises first-part faying surface 106, to second part 124, which comprises first second-part faying surface 108A and second second-part faying surface 108B. Second second-part faying surface 108B is spaced away from first second-part faying surface 108A. Method 200 comprises (block 202) moving first nozzle 112A, relative to support 110, such that first-nozzle separator plate 114A is inserted between and separates first-part faying surface 106 and first second-part faying surface 108A. Method 200 also comprises (block 204) moving second nozzle 112B, relative to support 110, such that second-nozzle separator plate 114B is inserted between and separates first-part faying surface 106 and second second-part faying surface 108B. Method 200 further comprises (block 206), with first-nozzle separator plate 114A inserted between and separating first-part faying surface 106 and first second-part faying surface 108A, dispensing adhesive 102, in a first-nozzle dispensing direction, from first-nozzle-body outlet port 116A into first space 104A, defined between first-part faying surface 106 and first second-part faying surface 108A. Method 200 also comprises (block 208), with first-nozzle separator plate 114A inserted between and separating first-part faying surface 106 and first second-part faying surface 108A, detecting presence of adhesive 102 between first-part faying surface 106 and first second-part faying surface 108A by using first ultrasonic-sensor roller 160A. Method 200 additionally comprises (block 210), with second-nozzle separator plate 114B inserted between and separating first-part faying surface 106 and second second-part faying surface 108B, dispensing adhesive 102, in a second-nozzle dispensing direction, from second-nozzle-body outlet port 116B into second space 104B, defined between first-part faying surface 106 and second second-part faying surface 108B. The first-nozzle dispensing direction is toward and opposite the second-nozzle dispensing direction. Method 200 also comprises (block 212), with second-nozzle separator plate 114B inserted between and separating first-part faying surface 106 and second second-part faying surface 108B, detecting the presence of adhesive 102 between first-part faying surface 106 and second second-part faying surface 108B by using second ultrasonic-sensor roller 160B.

Method 200 facilitates depositing adhesive 102 through first-nozzle-body outlet port 116A and second-nozzle-body outlet port 116B, into first space 104A and second space 104B between first part 122 and second part 124. Inserting first-nozzle separator plate 114A between first-part faying surface 106 and first second-part faying surface 108A acts as a wedge to facilitate separation between first part 122 and second part 124 to create first space 104A. Similarly, inserting second-nozzle separator plate 114B between first-part faying surface 106 and second second-part faying surface 108B promotes separation between first part 122 and second part 124 to create second space 104B. First-nozzle-body outlet port 116A and first-nozzle separator plate 114A enable adhesive 102 to be deposited, through first-nozzle-body outlet port 116A, into first space 104A when first-nozzle separator plate 114A is located between and is separating first part 122 and second part 124. Accordingly, a configuration of first-nozzle-body outlet port 116A and first-nozzle separator plate 114A maintains separation between first part 122 and second part 124 as adhesive 102 is deposited, through first-nozzle-body outlet port 116A, between first part 122 and second part 124. Likewise, second-nozzle-body outlet port 116B and second-nozzle separator plate 114B enable adhesive 102 to be deposited, through second-nozzle-body outlet port 116B, into second space 104B when second-nozzle separator plate 114B is located between and is separating first part 122 and second part 124. Accordingly, a configuration of second-nozzle-body outlet port 116B and second-nozzle separator plate 114B maintains separation between first part 122 and second part 124 as adhesive 102 is deposited, through second-nozzle-body outlet port 116B, between first part 122 and second part 124. Detecting the presence of adhesive 102 between first-part faying surface 106 and first second-part faying surface 108A, using first ultrasonic-sensor roller 160A, and between first-part faying surface 106 and second second-part faying surface 108B, using second ultrasonic-sensor roller 160B, helps to control the spread of dispensed adhesive and to prevent dispensing adhesive 102 between non-faying surface 129 of second part 124 and first-part faying surface 106 where adhesive 102 is not needed.

In some examples, second part 124 is a hat stringer. Accordingly, second part 124 includes elongated flanges (e.g., elongated into the page as shown in FIGS. 2A-6) and an elongated hat portion (e.g., elongated into the page as shown in FIGS. 2A-6) interposed between the elongated flanges. One of the elongated flanges, at first side 123 of second part 124, defines first second-part faying surface 108A and first outer surface 120A, which faces a direction, opposite that of first second-part faying surface 108A. The other one of the elongated flanges, at second side 131 of second part 124, defines second second-part faying surface 108B and second outer surface 120B, which faces a direction, opposite that of second second-part faying surface 108B. First second-part faying surface 108A is designed to be adhesively bonded to first-part faying surface 106 and second second-part faying surface 108B is designed to be adhesively bonded to first-part faying surface 106. However, non-faying surface 129 of second part 124, being defined by the elongated hat portion of second part 124 and designed to stand off from the first-part faying surface 106, is not designed to be adhesively bonded to first-part faying surface 106. Accordingly, because adhesive between non-faying surface 129 and first-part faying surface 106 is not necessary to adhesively bond second part 124 to first part 122, and would only add unnecessary weight and material cost, desirably, for adhesively bonding second part 124 to first part 122, adhesive 102 is deposited only between first second-part faying surface 108A and first-part faying surface 106 and between second second-part faying surface 108B and first-part faying surface 106.

Referring generally to FIGS. 11A, 11B, and 11C and particularly to, e.g., FIGS. 2A-10 for illustrative purposes only and not by way of limitation, the following portion of this paragraph delineates example 24 of the subject matter, disclosed herein. According to example 24, which encompasses example 23, above, method 200 further comprises (block 214) translationally moving end effector 100, relative to first part 122 and second part 124, perpendicular to rays, corresponding to the first-nozzle dispensing direction and the second-nozzle dispensing direction, simultaneously with (block 206) dispensing adhesive 102 in the first-nozzle dispensing direction and (block 210) dispensing adhesive 102 in the second-nozzle dispensing direction.

Moving end effector 100, perpendicular to rays, corresponding to the first-nozzle dispensing direction and the second-nozzle dispensing direction, simultaneously with dispensing adhesive 102 in the first-nozzle dispensing direction and dispensing adhesive 102 in the second-nozzle dispensing direction enables continuous, uniform, and controlled deposition of adhesive 102 between first part 122 and second part 124 along a dimension (e.g., length) of first part 122 and second part 124. End effector 100 is moved along translational-movement axis 127, which is perpendicular to the first-nozzle dispensing direction and the second-nozzle dispensing direction.

Figure 8:
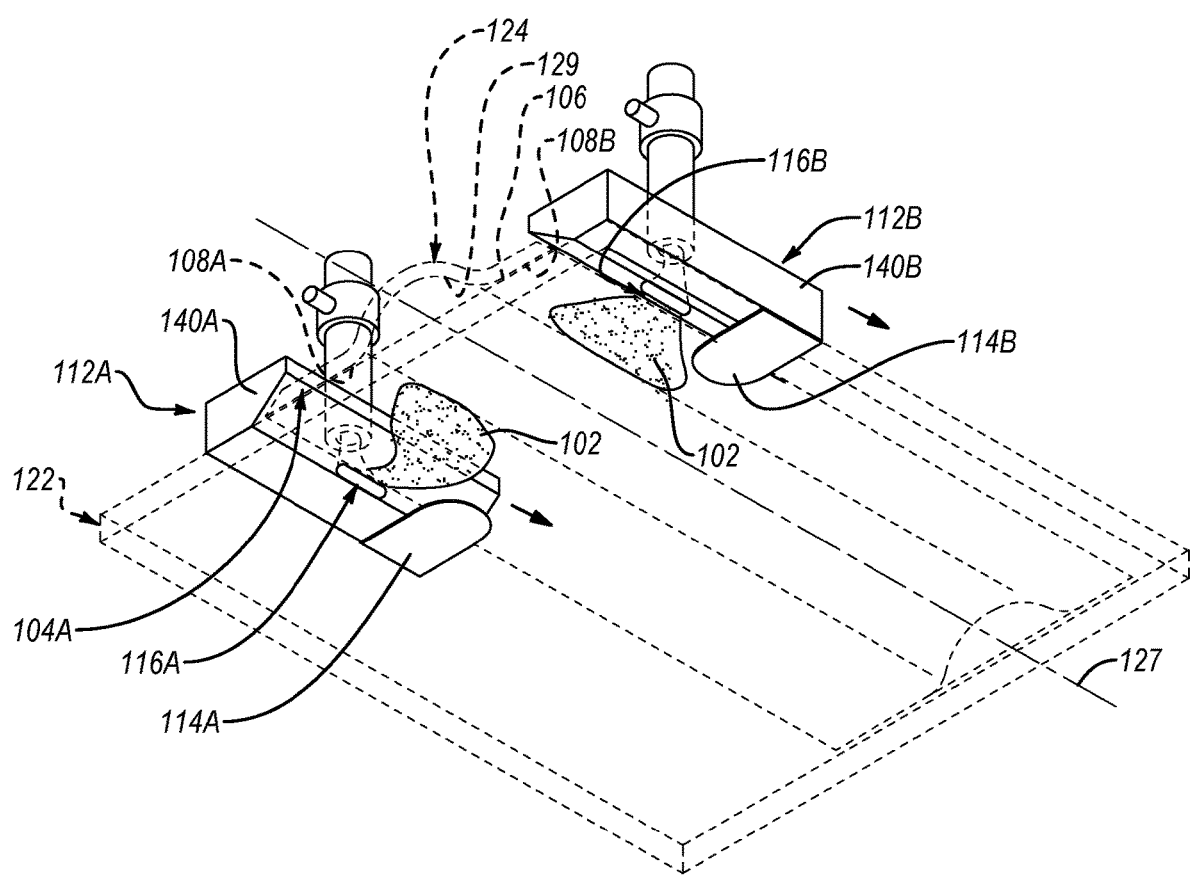
FIG. 8 is a schematic, perspective view of a first nozzle and a second nozzle of the apparatus of FIG. 1, according to one or more examples of the subject matter, disclosed herein.
Figure 9:
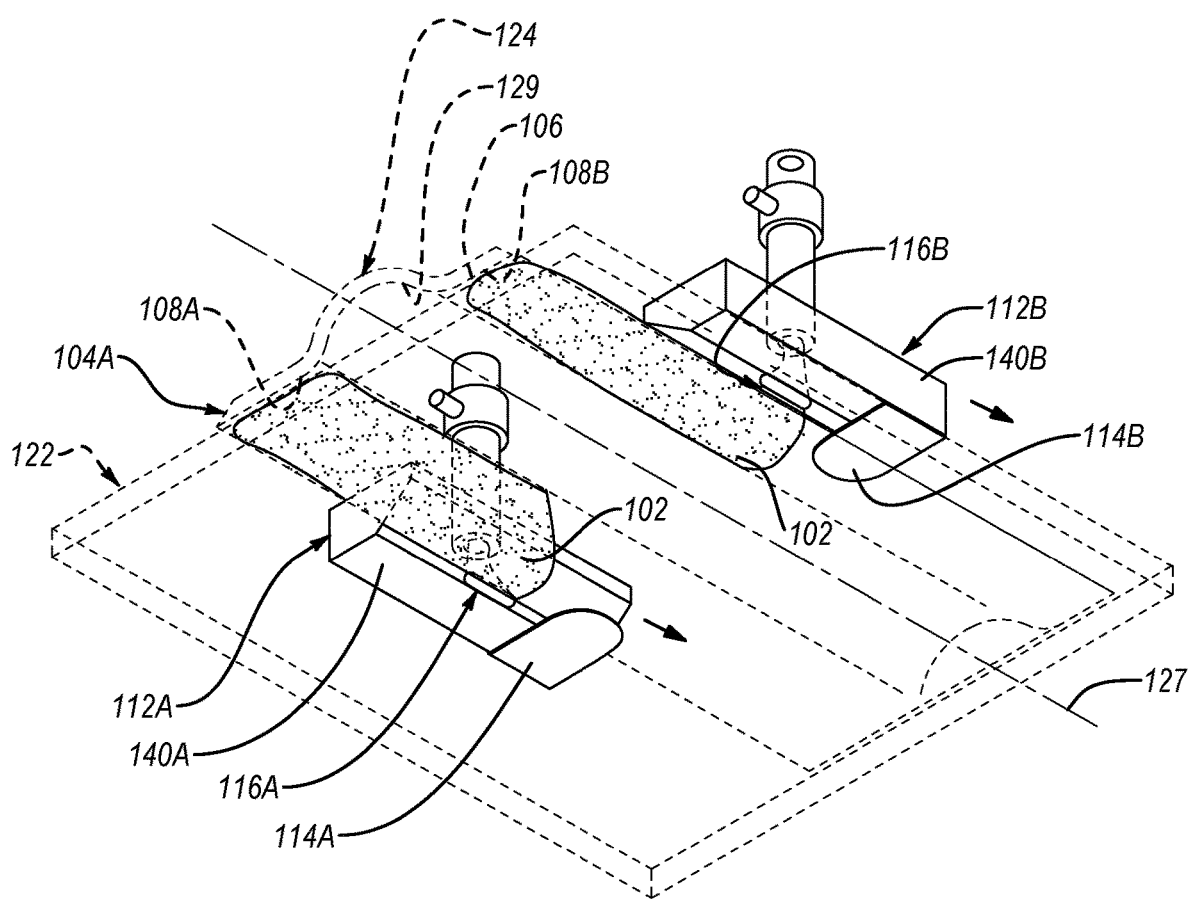
FIG. 9 is a schematic, perspective view of a first nozzle and a second nozzle of the apparatus of FIG. 1, according to one or more examples of the subject matter, disclosed herein.
Figure 10:
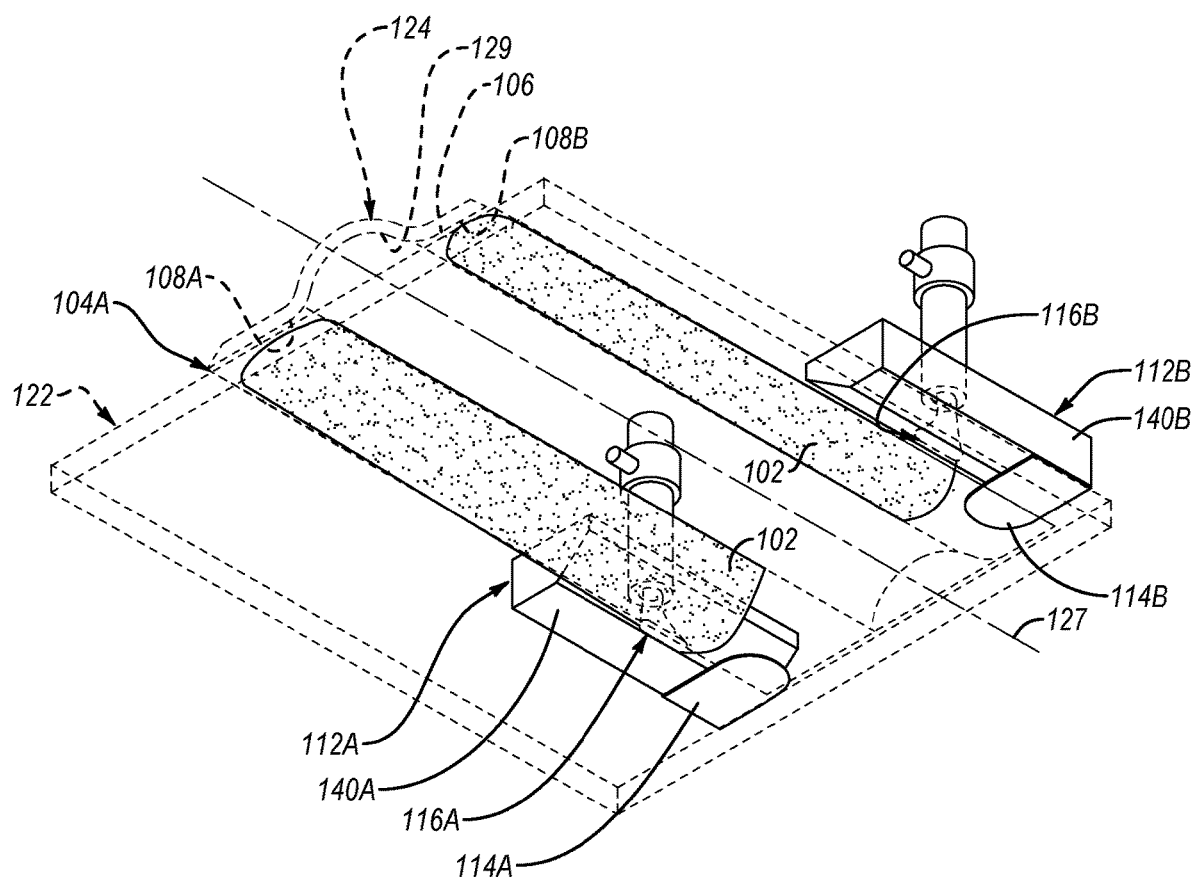
FIG. 10 is a schematic, perspective view of a first nozzle and a second nozzle of the apparatus of FIG. 1, according to one or more examples of the subject matter, disclosed herein.

Referring to FIGS. 8-10, illustrated is a progression of adhesive 102 being dispensed between first part 122 and second part 124 as end effector 100, and thus first nozzle 112A and second nozzle 112B, is translationally moved relative to first part 122 and second part 124.

Referring generally to FIGS. 11A, 11B, and 11C and particularly to, e.g., FIGS. 2A-6 for illustrative purposes only and not by way of limitation, the following portion of this paragraph delineates example 25 of the subject matter, disclosed herein. According to example 25, which encompasses example 24, above, method 200 further comprises, simultaneously with (block 214) translationally moving end effector 100 relative to first part 122 and second part 124, (block 216) rolling first ultrasonic-sensor roller 160A along first outer surface 120A of second part 124. First outer surface 120A and first second-part faying surface 108A face away from each other. Method 200 additionally comprises, simultaneously with (block 214) translationally moving end effector 100 relative to first part 122 and second part 124, (block 218) rolling second ultrasonic-sensor roller 160B along second outer surface 120B of second part 124. Second outer surface 120B and second second-part faying surface 108B face away from each other.

Rolling first ultrasonic-sensor roller 160A along first outer surface 120A of second part 124 and rolling second ultrasonic-sensor roller 160B along second outer surface 120B of second part 124, due to the close proximity of first ultrasonic-sensor roller 160A and second ultrasonic-sensor roller 160B to space between first part 122 and second part 124, enable accurate detection of adhesive 102 between first part 122 and second part 124. Additionally, in some examples, such as those in which end effector 100 does not have roller 118, first ultrasonic-sensor roller 160A and second ultrasonic-sensor roller 160B help to prevent movement of second part 124 away from first part 122.

Referring generally to FIGS. 11A, 11B, and 11C and particularly to, e.g., FIGS. 2A-6 for illustrative purposes only and not by way of limitation, the following portion of this paragraph delineates example 26 of the subject matter, disclosed herein. According to example 26, which encompasses example 25, above, method 200 further comprises (block 220), simultaneously with (block 216) rolling first ultrasonic-sensor roller 160A along first outer surface 120A of second part 124 and (block 218) rolling second ultrasonic-sensor roller 160B along second outer surface 120B of second part 124, biasing first ultrasonic-sensor roller 160A against first outer surface 120A of second part 124. Method 200 additionally comprises (block 222), simultaneously with (block 216) rolling first ultrasonic-sensor roller 160A along first outer surface 120A of second part 124 and (block 218) rolling second ultrasonic-sensor roller 160B along second outer surface 120B of second part 124, biasing second ultrasonic-sensor roller 160B against second outer surface 120B of second part 124.

Biasing first ultrasonic-sensor roller 160A against first outer surface 120A of second part 124 and biasing second ultrasonic-sensor roller 160B against second outer surface 120B of second part 124 promotes constant engagement of first ultrasonic-sensor roller 160A and second ultrasonic-sensor roller 160B, respectively, with second part 124, as end effector 100 moves relative to first part 122 and second part 124, and as adhesive 102 is dispensed through first-nozzle-body outlet port 116A and second-nozzle-body outlet port 116B.

Referring generally to FIGS. 11A, 11B, and 11C and particularly to, e.g., FIGS. 2A-10 for illustrative purposes only and not by way of limitation, the following portion of this paragraph delineates example 27 of the subject matter, disclosed herein. According to example 27, which encompasses example 26, above, method 200 further comprises (block 224), simultaneously with (block 206) dispensing adhesive in the first-nozzle dispensing direction and (block 210) dispensing adhesive in the second-nozzle dispensing direction, biasing first-nozzle separator plate 114A against first part 122. Method 200 additionally comprises (block 226), simultaneously with (block 206) dispensing adhesive in the first-nozzle dispensing direction and (block 210) dispensing adhesive in the second-nozzle dispensing direction, biasing second-nozzle separator plate 114B against first part 122.

Biasing first-nozzle separator plate 114A against first part 122 and biasing second-nozzle separator plate 114B against first part 122, simultaneously with dispensing adhesive 102, helps keep first-nozzle-body outlet port 116A and second-nozzle-body outlet port 116B in proper position relative to first part 122 to dispense adhesive 102 between first part 122 and second part 124.

Referring generally to FIGS. 11A, 11B, and 11C and particularly to, e.g., FIGS. 2A-10 for illustrative purposes only and not by way of limitation, the following portion of this paragraph delineates example 28 of the subject matter, disclosed herein. According to example 28, which encompasses any one of examples 25 to 27, above, second part 124 further comprises non-faying surface 129, interposed between first second-part faying surface 108A and second second-part faying surface 108B. Non-faying surface 129 extends from first second-part faying surface 108A at first junction 109A and extends from second second-part faying surface 108B at second junction 109B. According to method 200, (block 208) detecting presence of adhesive 102 between first-part faying surface 106 and first second-part faying surface 108A comprises (block 228) detecting the presence of adhesive 102 at first junction 109A of first second-part faying surface 108A and non-faying surface 129. According to method 200, (block 212) detecting the presence of adhesive 102 between first-part faying surface 106 and second second-part faying surface 108B comprises (block 230) detecting presence of adhesive 102 at second junction 109B of second second-part faying surface 108B and non-faying surface 129.

Detecting the presence of adhesive 102 at first junction 109A and at second junction 109B enables dispensing adhesive 102 up to, but not beyond, first junction 109A and second junction 109B.

Referring generally to FIGS. 11A, 11B, and 11C and particularly to, e.g., FIGS. 2A-10 for illustrative purposes only and not by way of limitation, the following portion of this paragraph delineates example 29 of the subject matter, disclosed herein. According to example 29, which encompasses any one of examples 24 to 28, above, method 200 further comprises, in response to (block 208) detecting the presence of adhesive 102 between first-part faying surface 106 and first second-part faying surface 108A by using first ultrasonic-sensor roller 160A, (block 232) adjusting at least one of a rate, at which adhesive 102 is dispensed from first-nozzle-body outlet port 116A, or a rate, at which end effector 100 translationally moves relative to first part 122 and second part 124. Method 200 also comprises, in response to (block 212) detecting the presence of adhesive 102 between first-part faying surface 106 and second second-part faying surface 108B by using second ultrasonic-sensor roller 160B, (block 234) adjusting at least one of a rate, at which adhesive 102 is dispensed from second-nozzle-body outlet port 116B, or a rate, at which end effector 100 translationally moves relative to first part 122 and second part 124.

Adjusting at least one of a rate, at which adhesive 102 is dispensed from first-nozzle-body outlet port 116A, or a rate, at which end effector 100 translationally moves relative to first part 122 and second part 124, in response to detecting the presence of adhesive 102 enables controlling the extent of spread of adhesive 102 between first part 122 and first second-part faying surface 108A of second part 124. Similarly, adjusting at least one of a rate, at which adhesive 102 is dispensed from second-nozzle-body outlet port 116B, or a rate, at which end effector 100 translationally moves relative to first part 122 and second part 124, in response to detecting the presence of adhesive 102 enables controlling the extent of spread of adhesive 102 between first part 122 and second second-part faying surface 108B of second part 124.

Referring generally to FIGS. 11A, 11B, 11C and particularly to, e.g., FIGS. 2A-6 for illustrative purposes only and not by way of limitation, the following portion of this paragraph delineates example 30 of the subject matter, disclosed herein. According to example 30, which encompasses any one of examples 23 to 29, above, method 200 further comprises (block 236) preventing movement of second part 124 away from first part 122 beyond a predetermined distance, simultaneously with (block 206) dispensing adhesive 102 in the first-nozzle dispensing direction and (block 210) dispensing adhesive 102 in the second-nozzle dispensing direction.

Preventing movement of second part 124 away from first part 122 beyond a predetermined distance, when adhesive is being dispensed between first part 122 and second part 124, helps maintain a thickness of adhesive 102 between first part 122 and second part 124 below a maximum thickness.

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus (es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. An end effector for adhesively attaching a first part to a second part, the end effector comprising:
    a support;
    a first nozzle, coupled to the support and movable relative to the support, wherein the first nozzle comprises:
        a first-nozzle body, comprising a first-nozzle-body outlet port; and
        a first-nozzle separator plate, extending from the first-nozzle body;
    a second nozzle, coupled to the support and movable relative to the support, wherein the second nozzle comprises:
        a second-nozzle body, comprising a second-nozzle-body outlet port; and
        a second-nozzle separator plate, extending from the second-nozzle body;
    a first ultrasonic-sensor roller, coupled to the support such that the first ultrasonic-sensor roller is translationally movable relative to the support wherein the first ultrasonic-sensor roller is rotatable relative to the support and is located between the first nozzle and the second nozzle; and
    a second ultrasonic-sensor roller, coupled to the support such that the second ultrasonic-sensor roller is translationally movable relative to the support wherein the second ultrasonic-sensor roller is rotatable relative to the support and is located between the first ultrasonic-sensor roller and the second nozzle.

2. The end effector according to claim 1, further comprising a part-retention roller, coupled to the support, rotatable relative to the support, and located between the first ultrasonic-sensor roller and the second ultrasonic-sensor roller.

3. The end effector according to claim 1, further comprising:
    a first-nozzle biasing member, configured to bias the first nozzle away from the support; and
    a second-nozzle biasing member, configured to bias the second nozzle away from the support.

4. The end effector according to claim 1, further comprising:
    a first arm, coupling the first nozzle to the support; and
    a second arm, coupling the second nozzle to the support
    wherein:
        the first arm is pivotable, relative to the support, such that the first arm is selectively pivotable to one of a first-arm disengaged position or a first-arm engaged position;
        the second arm is pivotable, relative to the support, such that the second arm is selectively pivotable to one of a second-arm disengaged position or a second-arm disengaged position; and
        the first-nozzle separator plate is closer to the second-nozzle separator plate when the first arm is in the first-arm engaged position and the second arm is in the second-arm engaged position than when the first arm is in the first-arm disengaged position and the second arm is in the second-arm disengaged position.

5. The end effector according to claim 4, further comprising:
    a first-nozzle biasing member, configured to bias the first nozzle away from the support; and
    a second-nozzle biasing member, configured to bias the second nozzle away from the support,
    wherein:
        the first-nozzle biasing member is a compression spring, coupled to the first nozzle and to the first arm; and
        the second-nozzle biasing member is a compression spring, coupled to the second nozzle and to the second arm.

6. The end effector according to claim 4, further comprising a first-arm axis, wherein:
    the first arm is pivotable, relative to the support, about the first-arm axis; and
    the second arm is pivotable, relative to the support, about the first-arm axis.

7. The end effector according to claim 6, further comprising:
    a part-retention roller, coupled to the support rotatable relative to the support, and located between the first ultrasonic-sensor roller and the second ultrasonic-sensor roller; and
    a roller axis,
    wherein:
        the part-retention roller is rotatable about the roller axis; and
        a virtual plane, containing the first-arm axis, is perpendicular to a virtual plane, containing the roller axis.

8. The end effector according to claim 4, further comprising a first-arm axis and a second-arm axis which is parallel to the first-arm axis, wherein:
    the first arm is pivotable, relative to the support about the first-arm axis; and
    the second arm is pivotable, relative to the support about the second-arm axis.

9. The end effector according to claim 8, further comprising:
    a part-retention roller, coupled to the support rotatable relative to the support, and located between the first ultrasonic-sensor roller and the second ultrasonic-sensor roller; and
    a roller axis;
    wherein:

the part-retention roller is rotatable about the roller axis; and virtual planes, containing the first-arm axis and the second-arm axis respectively, are perpendicular to a virtual plane, containing the roller axis.

10. The end effector according to claim 4, further comprising a positive-pressure source, wherein:
the first nozzle is fluidically coupled with the positive-pressure source;
the second nozzle is fluidically coupled with the positive-pressure source;
the first-nozzle-body outlet port is configured to dispense an adhesive in a first-nozzle dispensing direction;
the second-nozzle-body outlet port is configured to dispense the adhesive in a second-nozzle dispensing direction; and
when the first arm is in the first-arm engaged position, and when the second arm is in the second-arm engaged position, the first nozzle and the second nozzle are oriented relative to each other such that a ray, corresponding with the first-nozzle dispensing direction, is directed toward and is co-linear with a ray, corresponding with the second-nozzle dispensing direction.

11. The end effector according to claim 4, wherein:
the first arm couples the first ultrasonic-sensor roller to the support and
the second arm couples the second ultrasonic-sensor roller to the support.

12. The end effector according to claim 11, further comprising:
a first-sensor biasing member, coupled to the first arm and configured to bias the first ultrasonic-sensor roller away from the support; and
a second-sensor biasing member, coupled to the second arm and configured to bias the second ultrasonic-sensor roller away from the support.

13. The end effector according to claim 4, wherein:
the first-nozzle separator plate comprises a first-nozzle-separator-plate first-part engagement surface and a first-nozzle-separator-plate second-part engagement surface;
the first-nozzle-separator-plate first-part engagement surface and the first-nozzle-separator-plate second-part engagement surface are parallel to each other;
the second-nozzle separator plate comprises a second-nozzle-separator-plate first-part engagement surface and a second-nozzle-separator-plate second-part engagement surface;
the second-nozzle-separator-plate first-part engagement surface and the second-nozzle-separator-plate second-part engagement surface are parallel to each other;
when the first arm is in the first-arm disengaged position, and the second arm is in the second-arm disengaged position, the first-nozzle-separator-plate first-part engagement surface and the second-nozzle-separator-plate first-part engagement surface are non-coplanar; and
when the first arm is in the first-arm engaged position, and the second arm is in the second-arm engaged position, the first-nozzle-separator-plate first-part engagement surface and the second-nozzle-separator-plate first-part engagement surface are coplanar.

14. The end effector according to claim 4, further comprising a positive-pressure source, wherein:
the first nozzle is fluidically coupled with the positive-pressure source; and
the second nozzle is fluidically coupled with the positive-pressure source.

15. The end effector according to claim 4, further comprising:
a first linear slide coupling the first nozzle to the first arm such that the first nozzle is movable relative to the first arm; and
a second linear slide, coupling the second nozzle to the second arm such that the second nozzle is movable relative to the second arm.

16. The end effector according to claim 4, further comprising:
a first actuator, coupled to the support and to the first arm, wherein the first actuator is selectively actuatable such that the first arm pivots to one of the first-arm engaged position or the first-arm disengaged position; and
a second actuator, coupled to the support and the second arm, wherein the second actuator is selectively actuatable such that the second arm pivots to one of the second-arm engaged position or the second-arm disengaged position.

17. The end effector according to claim 1, further comprising a proximity sensor, coupled to the support and configured to emit an electromagnetic field and detect changes in the electromagnetic field.

18. A method of using the end effector of claim 1 for adhesively attaching the first part, which comprises a first-part faying surface WO, to the second part, which comprises a first second-part faying surface and a second second-part faying surface, spaced away from the first second-part faying surface, the method comprising steps of:
moving the first nozzle, relative to the support such that the first-nozzle separator plate is inserted between and separates the first-part faying surface and the first second-part faying surface;
moving the second nozzle, relative to the support such that the second-nozzle separator plate is inserted between and separates the first-part faying surface and the second second-part faying surface;
with the first-nozzle separator plate inserted between and separating the first-part faying surface and the first second-part faying surface:
dispensing an adhesive in a first-nozzle dispensing direction, from the first-nozzle-body outlet port into a first space, defined between the first-part faying surface and the first second-part faying surface; and
detecting presence of the adhesive between the first-part faying surface and the first second-part faying surface by using the first ultrasonic-sensor roller; and
with the second-nozzle separator plate inserted between and separating the first-part faying surface and the second second-part faying surface:
dispensing the adhesive, in a second-nozzle dispensing direction, from the second-nozzle-body outlet port into a second space, defined between the first-part faying surface and the second second-part faying surface, wherein the first-nozzle dispensing direction is toward and opposite the second-nozzle dispensing direction; and
detecting the presence of the adhesive between the first-part faying surface and the second second-part faying surface by using the second ultrasonic-sensor roller.

19. The method according to claim 18, further comprising a step of translationally moving the end effector, relative to the first part and the second part, perpendicular to rays, corresponding to the first-nozzle dispensing direction and the second-nozzle dispensing direction, simultaneously with the steps of dispensing the adhesive in the first-nozzle dispensing direction and dispensing the adhesive in the second-nozzle dispensing direction.

20. The method according to claim 19, further comprising, simultaneously with the step of translationally moving the end effector relative to the first part and the second part, steps of:
 rolling the first ultrasonic-sensor roller along a first outer surface of the second part, wherein the first outer surface and the first second-part faying surface face away from each other; and
 rolling the second ultrasonic-sensor roller along a second outer surface of the second part, wherein the second outer surface and the second second-part faying surface face away from each other.

* * * * *